United States Patent [19]

Sakamoto et al.

[11] Patent Number: 5,173,869
[45] Date of Patent: Dec. 22, 1992

[54] METHOD OF SIMULATING A SEQUENTIAL CONTROL FOR ANALYZING A PRODUCTION LINE IN A PRODUCTION SYSTEM

[75] Inventors: Shunji Sakamoto, Higashihiroshima; Toshihiko Hoshino, Hiroshima, both of Japan

[73] Assignee: Mazda Motor Corporation, Hiroshima, Japan

[21] Appl. No.: 629,964

[22] Filed: Dec. 21, 1990

[30] Foreign Application Priority Data

Dec. 25, 1989 [JP] Japan .................. 1-335271
Sep. 28, 1990 [JP] Japan .................. 2-260143

[51] Int. Cl.$^5$ .................. G06F 15/20; G05B 9/02
[52] U.S. Cl. .................. 364/578; 364/147; 395/500
[58] Field of Search .............. 364/578, 147, 191, 192, 364/551.01; 395/500

[56] References Cited

U.S. PATENT DOCUMENTS

| | | | |
|---|---|---|---|
| 4,149,235 | 4/1979 | Froyd et al. .................. | 364/578 |
| 4,167,788 | 9/1979 | Senba .................. | 364/147 |
| 4,247,901 | 1/1981 | Martin et al. .................. | 395/500 |
| 4,455,619 | 6/1984 | Masui et al. .................. | 364/147 |
| 4,742,443 | 5/1988 | Rohn et al. .................. | 364/136 |
| 4,858,101 | 8/1989 | Stewart et al. .................. | 364/147 |
| 4,991,076 | 2/1991 | Zifferer et al. .................. | 364/147 |

FOREIGN PATENT DOCUMENTS

| | | |
|---|---|---|
| 0092312 | 3/1983 | European Pat. Off. . |
| 0177164 | 8/1985 | European Pat. Off. . |
| 148264 | 12/1979 | Fed. Rep. of Germany . |
| 3430971A1 | 8/1984 | Fed. Rep. of Germany . |
| 63-106004 | 5/1988 | Japan . |
| 1-28962 | 6/1989 | Japan . |
| 0098706 | 4/1990 | Japan .................. 364/147 |
| 2-84205 | 11/1990 | Japan .................. 364/147 |
| 1383093 | 4/1972 | United Kingdom . |

*Primary Examiner*—Parshotam S. Lall
*Assistant Examiner*—Ellis B. Ramirez

[57] ABSTRACT

A method of simulating a sequential control program by composing simulation ladder program elements with timer elements which correspond to the ladder program elements of the sequential control program. If the operations of a plurality of operation steps are performed in parallel with each other, a time chart is prepared by considering the parallel relationships between the operation steps, and simulation elements are thereafter formed in execution order in accordance with the timing chart.

8 Claims, 20 Drawing Sheets

| No. | SC-REG | BLOCK NAME | FROM | TO | CLEAR CONDITION | EQUIPMENT |
|---|---|---|---|---|---|---|
| B0 | D1000 | RECEIVING STAND POSITIONING | BODY PRESENT ON STAND | B3 | B5 | 119 |
| B1 | D1001 | TRANSFER DEVICE PREPARING | BODY PRESENT ON STAND | B3 | B7 | 116 |
| B2 | D1002 | STRUT CLAMPING PREPARING | BODY PRESENT IN ST2 | B4 | B8 | 140 |
| B3 | D1003 | TRANSFER DEVICE RECEIVING | B0, B1 | B5, B6 | B7 | 119, 116 |
| B4 | D1004 | SLIDE DEVICE PREPARING | B2 | B6 | B7, B8 | 145 |
| B5 | D1005 | RECEIVING STAND RETURNING | B3 | - | B5 | 119 |
| B6 | D1006 | ENGINE/SUSPENSION DOCKING | B3, B4 | B7, B8 | B7, B8 | 116, 140, 145 |
| B7 | D1007 | TRANSFER DEVICE RETURNING | B6 | - | B7 | 116 |
| B8 | D1008 | CLAMP ARM RETURNING | B6 | - | B8 | 140 |
| B9 | D1009 | LINEAR MOTOR DRIVING | BODY PRESENT IN ST2 | - | B9 | 117 |
| B10 | D1010 | SCREWING ① | BODY PRESENT IN ST3 | - | B10 | 148A |
| B11 | D1011 | SCREWING ② | BODY PRESENT IN ST3 | - | B11 | 148B |

Fig. 6

119 POSITIONING DEVICE B0, B3, B5

| NO. | COMMENT | OPERATION | OUTPUT COIL DEVICE | CONF. INPUT CONTACT | MANUAL INPUT CONTACT | ORIGINAL POSITION |
|---|---|---|---|---|---|---|
| A01 | WORK PRESENT | | | X0 | X1 | . |
| A02 | BF(POSITIONING) | OUT | Y1 | X1 | XB | |
| A03 | BF(POSITIONING) | RETURN | Y2 | X2 | XC | o |
| A04 | BR(POSITIONING) | OUT | Y3 | X3 | XD | |
| A05 | BR(POSITIONING) | RETURN | Y4 | X4 | XE | o |
| A06 | TL(POSITIONING) | OUT | T5 | X5 | XF | |
| A07 | TL(POSITIONING) | RETURN | Y6 | X6 | X10 | o |
| A08 | FR (REF. PIN) | OUT | Y7 | X7 | X11 | |
| A09 | FR (REF. PIN) | RETURN | Y8 | X8 | X12 | o |
| A10 | FL (REF. PIN) | OUT | Y9 | X9 | X13 | |
| A11 | FL (REF. PIN) | RETURN | YA | XA | X14 | o |
| A12 | RR (REF. PIN) | OUT | YB | XB | X15 | |
| A13 | RR (REF. PIN) | RETURN | YC | XC | X16 | o |
| A14 | RL (REF. PIN) | OUT | YD | XD | X17 | |
| A15 | RL (REF. PIN) | RETURN | YE | XE | X18 | o |

Fig. 7

| NO. | COMMENT | OPERATION | OUTPUT COIL | CONFIRMATION INPUT CONTACT | MANUAL INPUT CONTACT | ORIGINAL POSITION | RETURN CONFIRMATION CONTACT | SIMULTANEOUS OPERATION | OPERATION PERIOD |
|---|---|---|---|---|---|---|---|---|---|
| B000 | OPERATION BLK. PREPARING | - | | | | | | | $\tau_0$ |
| B0S0 | CONDITION CONFIRMATION | OUT | Y0 | X0 | XA | | | | $\tau_{00}$ |
| B0S1 | BF(POSITIONING) | OUT | Y1 | X1 | XB | | X8 | | $\tau_{01}$ |
| B0S2 | BR(POSITIONING) | OUT | Y2 | X2 | XC | | X9 | | $\tau_{02}$ |
| B0S3 | TL(POSITIONING) | OUT | Y3 | X3 | XD | | | | $\tau_{03}$ |
| B0S4 | FR (REF. PIN) | OUT | Y4 | X4 | XE | | | 1 | $\tau_{04}$ |
| B0S5 | FL (REF. PIN) | OUT | Y5 | X5 | XF | | | 1 | $\tau_{05}$ |
| B0S6 | RR (REF. PIN) | OUT | Y6 | X6 | X10 | | | 1 | $\tau_{06}$ |
| B0S7 | RL (REF. PIN) | OUT | Y7 | X7 | X11 | | | 1 | $\tau_{07}$ |
| B0S8 | BF (RETURNING) | RETURN | Y8 | X8 | X12 | o | | | $\tau_{08}$ |
| B0S9 | BR (RETURNING) | RETURN | Y9 | X9 | X13 | o | | | $\tau_{09}$ |
| B999 | OPERATION BLK COMPLETED | | | | | | | | |

Fig. 8

METHOD OF SIMULATING A SEQUENTIAL CONTROL FOR ANALYZING A PRODUCTION LINE IN A PRODUCTION SYSTEM

BACKGROUND OF THE INVENTION

This invention relates to a method of confirming, by simulation, whether or not a sequential operation control program for conducting sequential operations of equipment for a production line or the like operates as is intended to be designed, i.e., a method of composing a simulation program and a method of effecting simulation. More particularly, this invention relates to a simulation program composition method and a simulation method used in a case where the control program involves parallel operations.

A system of controlling a production line such as a motor vehicle assembly line is known which includes a sequential control unit incorporating a computer to effect sequential control of various equipment units provided for the production line with respect to operations which are to be successively effected by the equipment. To perform such sequential control, the computer incorporated in the sequential control unit is loaded with a sequential control program, and successively conducts steps of control of the operations of equipment units provided along the production line in accordance with the sequential control program.

For this kind of sequential control program, simulation for confirming whether or not the program operates in accordance with the program design is performed before the sequential control is actually conducted. To perform this simulation, in ordinary conventional systems, simulating input/output signals corresponding to the actual operations of the equipment units are applied from the outside.

Conventionally, to apply simulating input/output signals for the sequential control program from the outside, it is necessary to provide a multiplicity of switches or the like for producing simulating input/output signals, and the operator who operates the incorporated computer selects input/output signals which are to be applied and sets the order and timing of application of the selected input/output signals. This operation is troublesome. Also, since the switching elements or the like for producing the input/output signals are operated by a human operator, the kinds of phenomena which can be simulated are limited and it is difficult to examine the entire program.

Another problem with the conventional simulation method described below has been pointed out. Generally, in actual production lines, there is a unit block, namely a plurality of equipment units, which operates in parallel with other blocks. According to the conventional method, for simulation of a sequential control program for such unit blocks which operate in parallel with each other, the operation of the blocks are changed into the operations of serial blocks, and simulating operations are successively performed with respect to the equipment units. For example, where the operations of two blocks A and B are performed in parallel with each other, simulation of all the operation steps of the block A is first executed sequentially and simulation of all the operation steps of the block B is thereafter executed sequentially.

In the conventional simulation method, however, simulated operations are, of course, different from the actual operations since the actual parallel operations are simulated after being converted into serial operations. For this reason, it cannot be said that the conventional simulation method enables the program to be examined accurately. Moreover, it will take a long time to sequentially execute the simulation of parallel operations.

SUMMARY OF THE INVENTION

The present invention solves the above-described problems of the conventional methods. Specifically, an object of the present invention is to provide a simulation program composition method and a simulation method which have improved facility with which a program for simulation of a sequential control program is composed and which enable automation of composition of the simulation program.

To achieve this object, according to the present invention, there is provided a method of composing a simulation program for simulating a sequential control program describing sequential operations of a production system having a plurality of equipment units, the sequential control program including a plurality of objective ladder program elements describing the operations of operation steps constituting or including the sequential operations of the production line, each of the objective ladder program elements including an interlock condition describing conditions which are to be satisfied to start the element, and a confirmation condition for confirming the completion of the operation step effected immediately before the corresponding operation step;

said method comprising the steps of:
previously measuring the time required to satisfy the interlock condition of each objective ladder program element of the sequential control program; and.

composing a simulation ladder program element parallel to each objective ladder program element of the sequential control program, said simulation ladder program element including:

a timer element for counting a time which is taken for the corresponding objective ladder program element and is previously measured in the measuring step; and a logic of forcibly satisfying the interlock condition of the objective ladder program element in response to the time-out of the timer element.

That is, the operation of the simulation object portion of the sequential control program is replaced with the timers, and the completion of operation is reduced to time-out of the timer.

Another object of the present invention is to provide a program simulation method whereby a program for equipment units including parallel operations in the operations of some operation blocks can be simulated by operations approximated to the actual parallel operation sequence.

To achieve this object, according to the present invention, there is provided a method of composing a simulation program for simulating a sequential control program in which unit operations of each of equipment units are expressed by operation steps, in which each of operation blocks constituted by sets of operation steps is performed independently of the other operation blocks from the start to the end, and in which sequential operations of all equipment units are described with sets of the operation blocks, the composition method comprising the steps of:

(a) forming an operation block map in which the operations of the plurality of operation blocks are described, and in which the fact that some of the operation blocks includes a single operation or a fact that some of the operation blocks includes an operation effected in parallel with some of the other operation blocks is described;

(b) forming an operation step map in which with respect to each operation step of each operation block, an execution sequence of the operation step and a predicted time required to execute the operation step are described; and (c) forming simulation ladder program elements for simulating the operation steps of each operation block in the operation step execution order determined on the basis of the operation block map and the operation step map.

In accordance with the simulation method of the present invention, the order of executing simulation of the operation steps of each operation blocks is controlled while recognizing parallel operations between the operation blocks based on the operation block map and the operation step map. It is therefore possible to effect parallel simulation of the operation steps even if the simulation program formed by the simulation ladder program element composition process is intended to simulate the operations of the operation steps in one operation block.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a diagram of the structure of an operation block map;

FIG. 7 is a diagram of the structure of an input/output map;

FIG. 8 is a diagram of the structure of an operation step map;

FIG. 20A is a diagram of an example of a program BRP in which the operations of two operation steps are performed in parallel with each other; and FIG. 20B is a diagram of a simulation program for the program of FIG. 20A.

DESCRIPTION OF THE PREFERRED EMBODIMENT

An embodiment of the present invention in which the invention is applied to sequential control of a motor vehicle production line will be described below with reference to the accompanying drawings.

The system of this embodiment has a section for automatically forming a sequential control program, and a section for forming a simulation program. A vehicle assembly line which is the control object of the sequential program will be described first. The section for automatically forming the sequential control program will next be described while referring to operation blocks and operation steps which are concepts important to this embodiment. Simulation program formation/execution control relating to the features of this embodiment will thereafter be described.

ASSEMBLY LINE

An example of a vehicle assembly line to be controlled by the sequential control program in accordance with the embodiment will be described below with reference to FIGS. 2 and 3.

Figure 2:
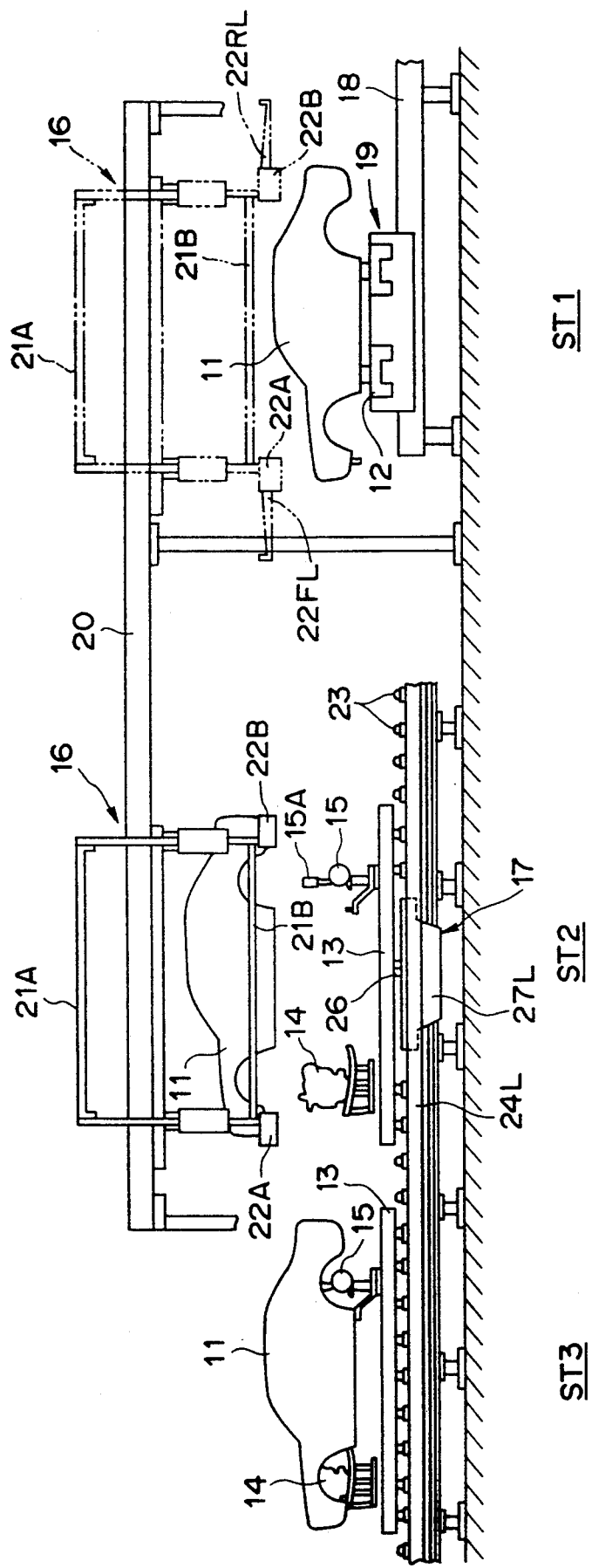
FIGS. 2, 3, and 4 are diagrams of the construction of a motor vehicle assembly line to which the present invention is applied.
Figure 3:
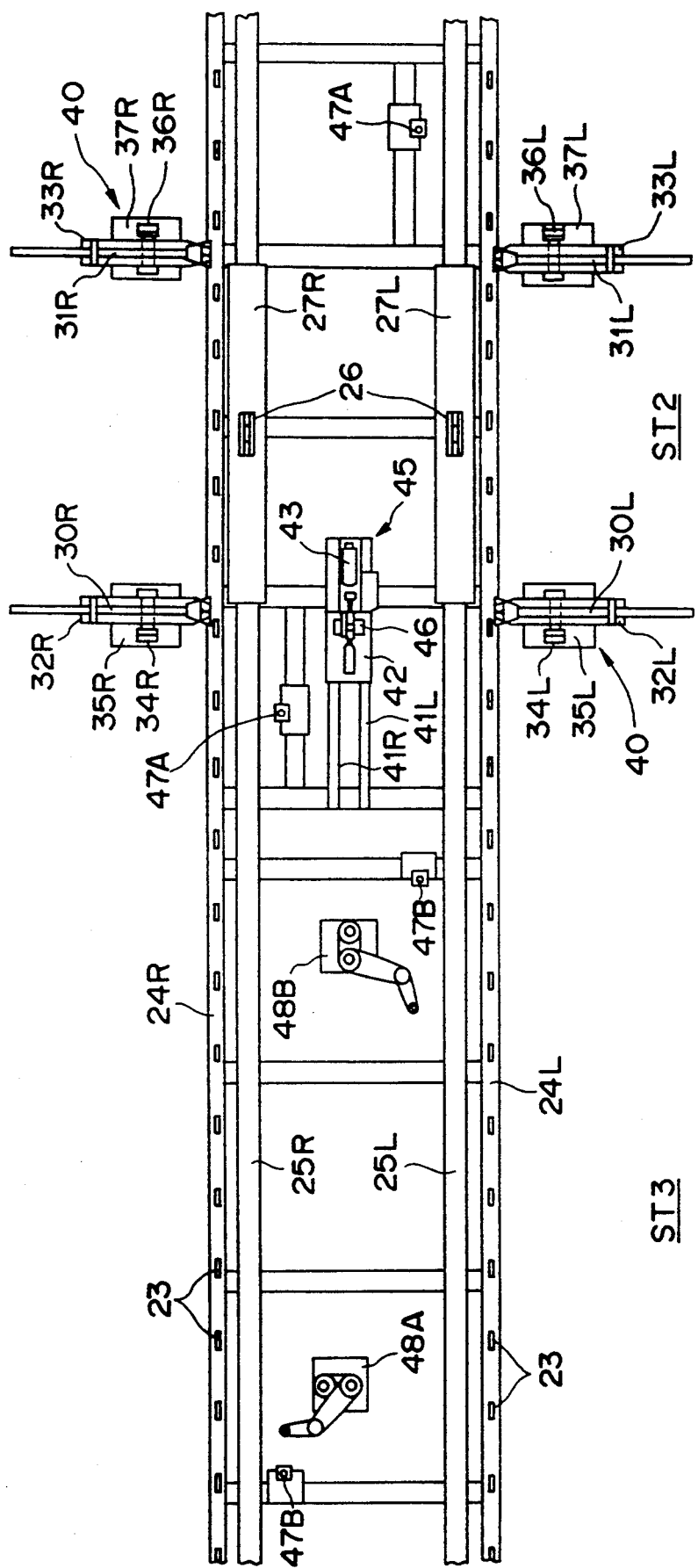

The vehicle assembly line shown in FIGS. 2 and 3 consists of or includes, for example, three stations: a positioning station ST1, a docking station ST2, and a screwing station ST3. At the positioning station ST1, a body 11 of a vehicle is placed on a receiving stand 12 and is positioned thereon by the positioning control of the receiving stand 12. At the docking station ST2, an engine 14, a front suspension assembly (not shown) and a rear suspension assembly 15 placed in predetermined positions on a pallet 13 are set in combination with the body 11. At the screwing station ST3, the engine 14, the front suspension assembly and the rear suspension assembly 15 set at the station ST2 are fixed to the body 11 by screwing with screws. An overhead type transfer device 16 for holding and transporting the body 11 is provided between the positioning station ST1 and the docking station ST2. A pallet carrier 17 for transporting the pallet 13 is provided between the docking station ST2 and the screwing station ST3.

The receiving stand 12 in the positioning station ST1 is reciprocatively moved along a rail 18. In the positioning station ST1 are provided a positioning means (denoted as BF) for positioning the body 11 placed on the receiving stand 12 with respect to a front portion of the body 11 in the widthwise direction of the vehicle by moving the receiving stand 12 in a direction perpendicular to the rail 18 (in the widthwise direction of the vehicle), another positioning means (BR) for positioning a rear portion of the body 11 in the widthwise direction of the vehicle, and a further positioning means (TL) for positioning the body 11 in the direction of the front or rear of the body 11 by moving the receiving stand along the rail 18 (in the direction of the front or rear end of the body 11). At the station ST1 are further provided lifting reference pins (FL, FR, RL, and RR) which are used to position the body 11 relative to the receiving stand 12 by being brought into engagement with left and right front portions and left and right rear portions of the body 11. These positioning means and the lifting reference pins constitute a positioning unit 19 in the positioning station ST1. That is, the positioning means and the lifting reference pins are objects of control based on the sequential control program with respect to the positioning unit 19.

Figure 4:
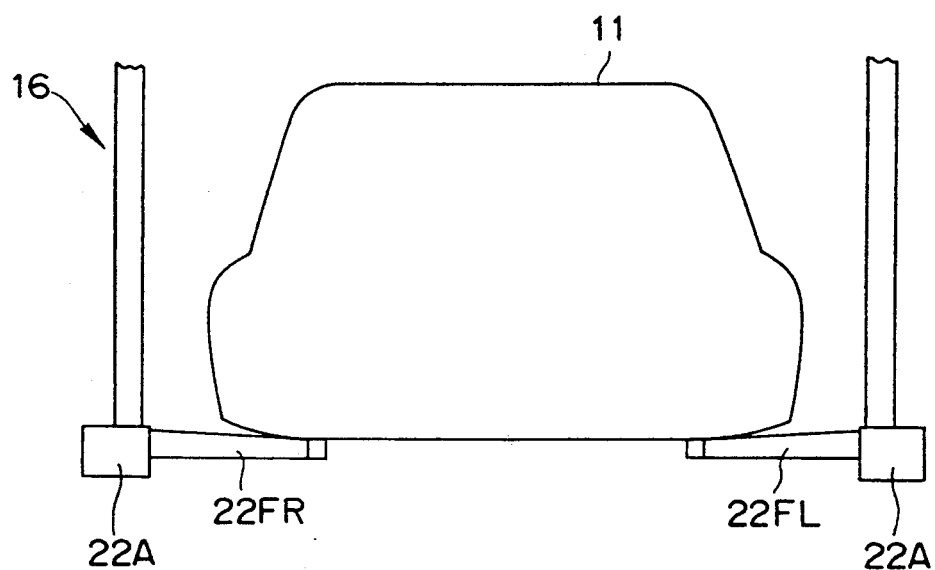

The transfer device 16 has a guide rail 20 extending over the positioning station ST1 and the docking station ST2, and a carrier 21A capable of moving along the guide rail 20. A lifting hanger frame 21B is attached to the carrier 21A, and the body 11 is supported by the lifting hanger frame 21B. As shown in FIG. 4, a left fore support arm 22FL and a right fore support arm 22FR are attached to the lifting hanger frame 21B through a pair of fore arm clamps 22A, and a left rear support arm 22RL and a right rear support arm 22RR (not shown) are also attached to the lifting hanger frame 21B through a pair of rear arm clamps 22B (22 RL is shown in FIG. 2).

Each of the left fore support arm 22FL and the right fore support arm 22FR (not shown) is rotated on the corresponding fore arm clamp 22A and is positioned such as to extend along the guide rail 20 when released from the state of being clamped by the fore arm clamp 22A, or is positioned such as to extend in a direction perpendicular to the guide rail 20 when clamped by the fore arm clamp 22A, as shown in FIG. 4. Similarly, each of the left rear support arm 22RL and the right rear support arm 22RR is rotated on the corresponding rear arm clamp 22B and is positioned such as to extend along the guide rail 20 when released from the state of being clamped by the rear arm clamp 22B, or is positioned such as to extend in a direction perpendicular to the guide rail 20 when clamped by the rear arm clamp 22B.

To load the transfer device 16 with the body 11, the transfer device 16 is moved to a position (starting position) indicated by a dot-dash line shown in FIG. 2, at which its front end is located right above the front end of the rail 18, and the left fore support arm 22FL and the right fore support arm 22FR are released from the state of being clamped by the clamps 22A to extend along the guide rail 20. The lifting hanger frame 21B is thereafter moved downward. In this state, the receiving stand 12 on which the body 11 is placed is moved along the rail 18 the front end of the rail 18 to be set in a position corresponding to that of the lifting hanger frame 21B of the transfer device 16 which has been moved downward. The left fore support arm 22FL and the right fore support arm 22FR are respectively rotated to the position extending in the direction perpendicular to the guide rail 20 below the front portion of the body 11, and are clamped by the front arm clamps 22A. Also, the right rear support arm 22RR and the left rear support arm 22RL are respectively rotated to the position extending in the direction perpendicular to the guide rail 20 below the rear portion of the body 11, and are clamped by the rear arm clamps 22B. Thereafter, the lifting hanger frame 21B is moved upward and the body 11 is supported by the left fore support arm 22FL, the right fore support arm 22FR, the left rear support arm 22RL and the right rear support arm 22RR attached to the lifting hanger frame 21B of the transfer device 16, as shown in FIG. 4.

As shown in FIG. 3, the pallet carrier 17 has a pair of guide members 24L and 24R on which a multiplicity of support rollers 23 for supporting the lower surface of the pallet 13 are mounted, a pair of transport rails 25L and 25R extending parallel to the guide members 24L and 24R, pallet transport bases 27L and 27R having pallet engagement portions 26 for engagement with the pallet 13 and movable along the transport rails 25L and 25R, and a linear motor mechanism (not shown) for driving the pallet transport bases 27L and 27R.

In the docking station ST2 are provided a pair of left and right fore clamp arms 30L and 30R and a pair of left and right rear clamp arms 31L and 31R which respectively support struts of the front suspension assembly and struts 15A of the rear suspension assembly 15 to set the same in assembled positions at the time of fitting of the front suspension assembly and the rear suspension assembly 15. The left and right fore clamp arms 30L and 30R are respectively attached to attachment plate members 32L and 32R so that they can advance or retreat in a direction perpendicular to the transport rails 25L and 25R, while the left and right rear clamp arms 31L and 31R are respectively attached to attachment plate members 33L and 33R so that they can also advance or retreat in a direction perpendicular to the transport rails 25L and 25R. The left and right fore clamp arms 30L and 30R and the left and right rear clamp arms 31L and 31R have, at their respective opposite extreme ends, engagement portions engagable with the struts of the front suspension assembly and the struts 15A of the rear suspension assembly 15. An arm slide 34L enables the attachment plate member 32L to move relative to a fixed base 35L in a direction parallel to the transport rails 25L and 25R. An arm slide 34R enables the attachment plate member 32R to move relative to a fixed base 35R in a direction parallel to the transport rails 25L and 25R. An arm slide 36L enables the attachment plate member 33L to move relative to a fixed base 37L in a direction parallel to the transport rails 25L and 25R. Further, an arm slide 36R enables the attachment plate member 33R to move relative to a fixed base 37R in a direction parallel to the transport rails 25L and 25R. Consequently, the left and right fore clamp arms 30L and 30R are movable in each of the longitudinal and widthwise directions of the carrier 17 while their extreme end portions are in engagement with the struts of the front suspension assembly. Also, the left and right rear clamp arms 31L and 31R are movable in each of the longitudinal and widthwise directions of the carrier 17 while their extreme end portions are in engagement with the struts 15A of the rear suspension assembly 15. The left and right fore clamp arms 30L and 30R, the arm slides 34L and 34R, the left and right rear clamp arms 31L and 31R, and the arm slides 36L and 36R constitute docking devices 40.

In the docking station ST2 are further provided a pair of slide rails 41L and 41R extending parallel to the transport rails 25L and 25R, and a slide device 45 including a movable member 42 slidable along the slide rails 41L and 41R and a motor 43 for driving the movable member 42. On the movable member 42 of the slide device 45 are provided an engagement means or device 46 for engagement with a movable engine support member (not shown) provided on the pallet 13, and a pair of lifting pallet reference pins 47A for setting the pallet in a predetermined position. When the engine 14, the front suspension assembly and the rear suspension assembly 15 placed on the pallet 13 are set in combination with the body 11 supported by the lifting hanger frame 22 of the transfer device 16, the engagement means 46 of the slide device 45 is moved along the rails 41L and 41R while engaging with the movable engine support member positioned by the lifting pallet reference pins 47A on the pallet 13 to move the engine 14 relative to the body 11 in the same direction, thereby avoiding interference between the body 11 and the engine 14.

In the screwing station ST3 are disposed a robot 48A for screwing operation of fixing to the body 11 the engine 14 and the front suspension assembly set in combination with the body 11, and another robot 48B for screwing operation of fixing to the body 11 the rear suspension assembly 15 set in combination with the body 11. A pair of lifting pallet reference pins 47B for setting the pallet 13 in a predetermined position are also provided in the screwing station ST3.

In the vehicle assembly line described with reference to FIGS. 2 to 4, the positioning unit 19 and the transfer device in the positioning station ST1, the docking devices 40, the slide device 45 and the pallet transport unit 17 in the docking station ST2, and the robots 48A and 48B in the fastening station ST3 are controlled in a sequential manner based on a sequential control program formed by a program composition apparatus in accordance with this embodiment. That is, the positioning unit 19, the transfer device and so on are "equipment units" which are the objects of the sequential control.

Operation Blocks

The assembling operation of the production line shown in FIG. 2, i.e., the operations effected by all the equipment units which are the objects of sequential control can be separated into a plurality of "operation blocks". Each operation block is defined as described below.

①: An operation block is a set of a plurality of unit operations. One of the most important properties of an operation block resides in that ②: the operation of each operation block can be completed independently of other operation blocks without any interference of the same during the intermediate process between the start and the end of the operation block.

Because of the properties ① and ②, each operation block can be described as a block (batch). In other words, each operation block relates to other operation blocks only at operation block level. To start the operation of one operation block, the termination of the operation of at least one other operation block is required. That is, the termination of the operation of one operation block is used as the condition for starting another operation block (or a plurality of operation blocks) connected to it, or the termination of the operation of a plurality of operation blocks is used as the condition for starting another operation block.

According to the above-mentioned properties, no intermediate stage of the operation of one operation block, initiates other blocks. Also, at any intermediate step of one operation block, no start-up from other blocks is waited or suspended.

The following incidental property ③ of the operation block can be induced from the definition of the operation block shown in ① and ②.

③ Preferably, each operation block is the greatest of possible sets of unit operations having the properties ① and ②.

The property ③ is not absolutely necessary. However, if the condition ③ is satisfied, the number of blocks with which the production line is described is reduced and the description of the whole process is simplified and is easy to read.

The production line shown in FIGS. 2 and 3 is described with operation blocks satisfying the conditions ① to ③, thereby obtaining 17 operation blocks A0 to A4 and B0 to B11 described below.

Of these 17 operation blocks, 12 operation blocks B0 to B11 are shown below.

Block B0: an operation block for positioning the receiving stand 12 and the body 11 on the receiving stand 12 with the positioning unit 19. This operation block is called a receiving stand positioning block.

Block B1: an operation block of preparing the transfer device 16 to carry the body 11. This operation block is called a transfer device preparation block.

Block B2: an operation block of preparing the docking devices 40 to clamp the struts of the front suspension assembly by the left and right fore clamp arms 30L and 30R and to clamp the struts 15A of the rear suspension assembly 15 by the left and right rear clamp arms 31L and 31R. This operation block is called a strut clamping preparation block.

Block B3: an operation block of moving the body 11 positioned on the receiving stand 12 by the positioning unit 19 to the lifting hanger frame 21B of the transfer device 16. This operation block is called a transfer device reception block.

Block B4: an operation block of preparing the slide device 45 to engage the engagement means 46 provided on the movable member 42 with the movable engine support member on the pallet 13. This operation block is called a slide device preparation block.

Block B5: an operation block of returning the receiving stand 12 to the starting position with the positioning unit 19. This operation block is called a receiving stand returning block.

Block B6: an operation block of combining the engine 14 disposed on the pallet 13, the struts of the front suspension assembly disposed on the pallet 13 and clamped by the left and right fore clamp arms 30L and 30R and the struts 15A of the rear suspension assembly 15 clamped by the left and right rear clamp arms 31L and 31R with the body 11 supported by the lifting hanger frame 21B of the transfer device 16. This operation block is called an engine/suspension docking block.

Block B7: an operation block of returning the transfer device 16 to the starting position. This operation block is called a transfer device returning block.

Block B8: an operation block of making the docking devices 40 return the left and right fore clamp arms 30L and 30R and the left and right rear clamp arms 31L and 31R to the respective starting positions.

This operation block is called a clamp arm returning block.

Block B9: an operation block of making the pallet carrier 17 operate the linear motor to transport the pallet 13 on which the body 11 in combination with the engine 14, the front suspension assembly and the rear suspension assembly 15 is placed to the screwing station ST3. This operation block is called a linear motor driving block.

Block B10: an operation block of performing screwing operation with the robot 48A to fix to the body 11 the engine 14 and the front suspension assembly set in combination with the body 11. This operation block is called a first screwing operation block.

Block B11: an operation block of performing screwing operation with the robot 48B to fix to the body 11 the rear suspension assembly 15 set in combination with the body 11. This operation block is called a second screwing operation block.

Figure 5:
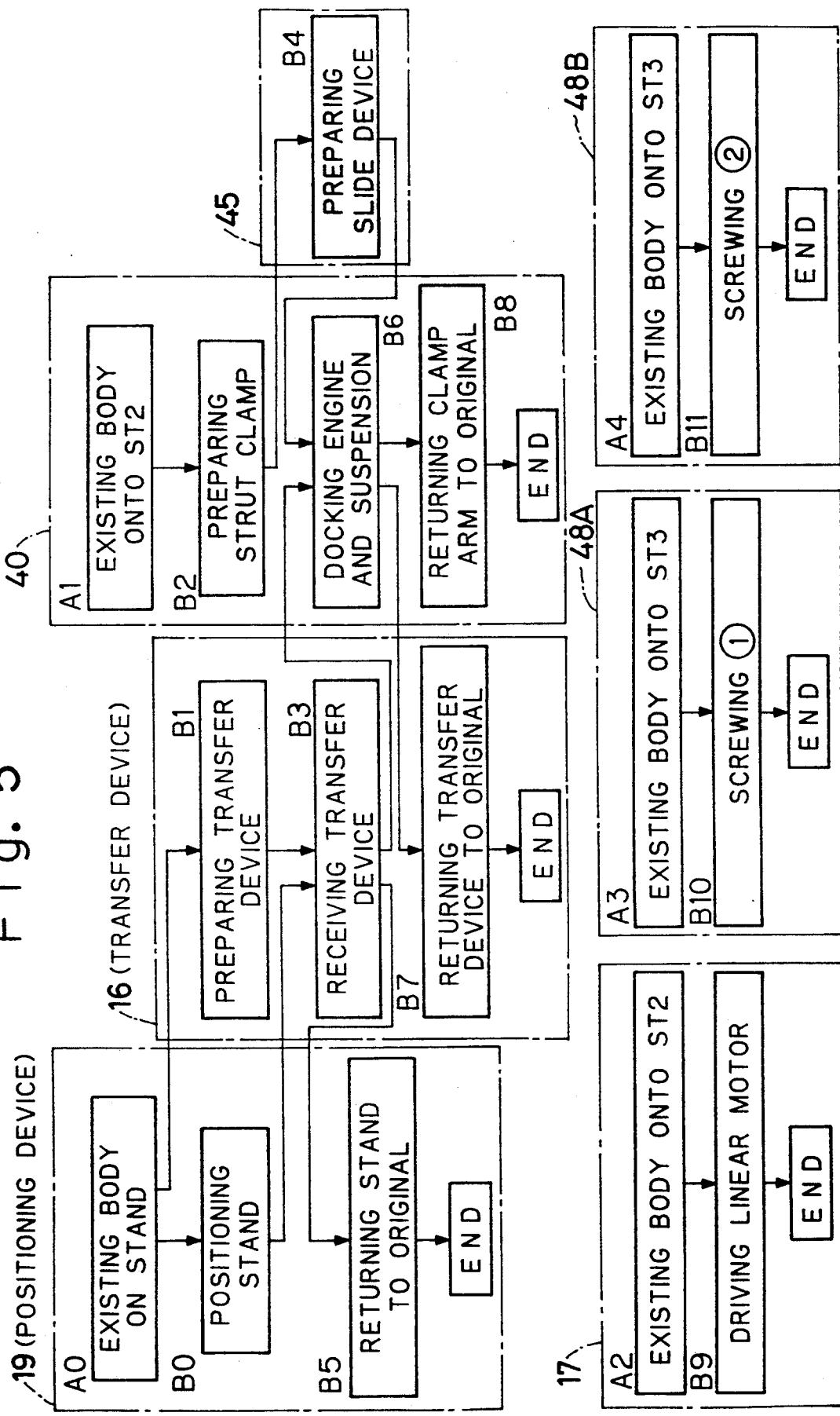
FIG. 5 is a diagram of the connections between blocks into which the operation of the assembly line are grouped.

FIG. 5 shows the relationship between the seventeen operation blocks A0 to A4 and B0 to B11 of the production line shown in FIGS. 5 to 7. The diagram of FIG. 5 is made by the programmer based on the analysis of the production line shown in FIGS. 2 to 4 in order to compose the sequential control program for this production line.

In FIG. 5, two lines are drawn to the block B3 relating to the transfer device 16 from the operation block B0 relating to the positioning unit 19 and the operation block B1 relating to the transfer device 16. These lines denote that the block B3 is started provided that the positioning operation (operation block B0) of the positioning unit 19 for positioning the receiving stand 12 and the body 11 placed on the receiving stand 12 is completed and that the preparation (operation block B1) for carrying the body 11 by the transfer device 16 is completed. In other words, the operations of the operation blocks B0 and B1 are performed in parallel with each other.

Operation Steps

Each of the above-described operation blocks B0 to B11 is divided into a plurality of operation steps each including an output operation. The provision of an output operation is a necessary condition for each operation step. However, since the operation steps are constituents of one operation block, each operation step in one operation block supplies no output to the operation steps of other operation blocks.

For example, the receiving stand positioning operation block B0 is divided into the following 10 operation steps B0S0 to B0S9.

B0S0: an operation step of confirming various conditions for starting the operation block B0 (called condition confirmation operation step).

B0S1: an operation step of moving the receiving stand 12 by the positioning means BF to position the front portion of the body 11 in the widthwise direction of the vehicle (BF positioning operation step).

B0S2: an operation step of moving the receiving stand 12 by the positioning means BR to position the rear portion of the body 11 in the widthwise direction of the vehicle (BR positioning operation step).

B0S3: an operation step of moving the receiving stand 12 by the positioning means TL to position the body 11 in the direction parallel to the rail 18 (TL positioning operation step).

B0S4: an operation step of bringing the lifting reference pin FR into engagement with a fore right side portion of the body 11 (FR engagement operation step).

B0S5: an operation step of bringing the lifting reference pin FL into engagement with a fore left side portion of the body 11 (FL engagement operation step).

B0S6: an operation step of bringing the lifting reference pin RR into engagement with a rear right side portion of the body 11 (RR engagement operation step).

B0S7: an operation step of bringing the lifting reference pin RL into engagement with a rear left side portion of the body 11 (RL engagement operation step).

B0S8: an operation step of returning the positioning means BF to the starting position after positioning the front portion of the body 11 in the widthwise direction of the vehicle (BF returning step).

B0S9: an operation step of returning the positioning means BR to the starting position after positioning the rear portion of the body 11 in the widthwise direction of the vehicle (BR returning step).

FIG. 8 shows examples of operation steps of the production line shown in FIG. 2.

Ladder Program Elements

Figure 9A:
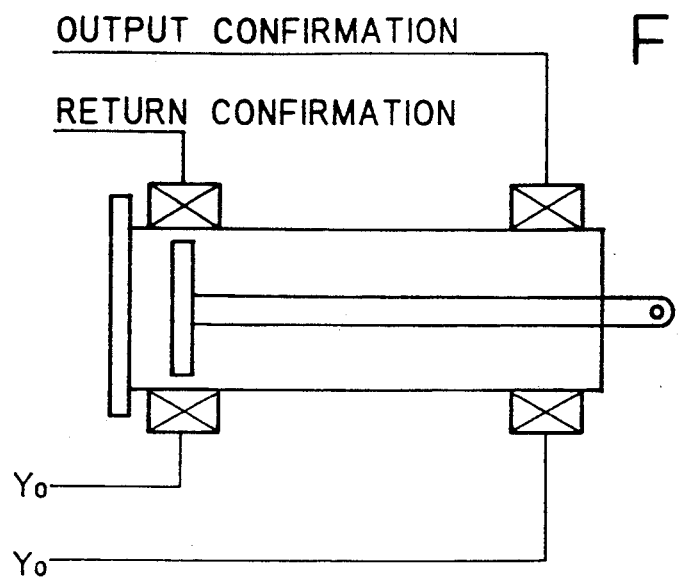
FIG. 9A is a diagram of expression of equipment symbolized by an actuator.

FIG. 9A shows a symbolized operation circuit for driving, for example, the lifting reference pin or the like of the production line shown in FIG. 2. An input of such an element is an input signal $Y_0$ for driving a solenoid provided as a mechanical part for driving this element. The signal $Y_0$ is output from a sequential ladder program element. That is, the operation of one operation step is symbolized by the cylinder operation effected by the solenoid. On the other hand, this element has two outputs for confirmation of the operated state of the element: one from a limit switch (output confirmation L/S) for confirming that the element is operated; and one from another limit switch (return confirmation L/S) for confirming that the element is returned to the home position. The operation of the corresponding operation step can be confirmed from the outputs from these confirmation limit switches.

Figure 9B:
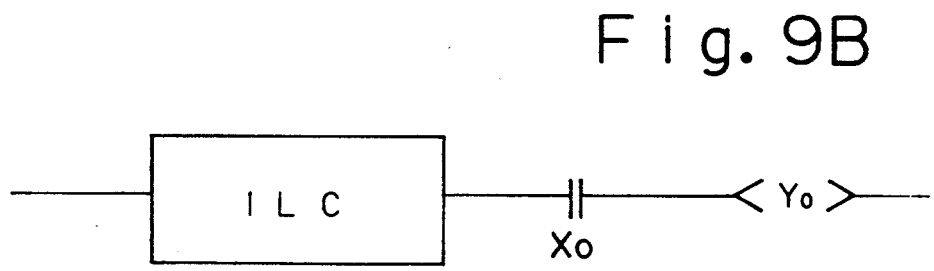
FIG. 9B is a diagram of the logic of one actuator.

FIG. 9B is a diagram of the logic of the output drive operation of the element shown in FIG. 9A, i.e., a diagram of a "ladder program element". To turn on the solenoid, an interlock conditions ILC and a confirmation condition $X_0$ are satisfied and output $Y_0$ is issued. The confirmation condition $X_0$ indicates that the operation of the sequential ladder element (not shown) immediately before the ladder element shown in FIG. 9B is confirmed. Accordingly, $X_0$ may indicate the confirmation of output operation or return operation. Ordinarily, the interlock conditions ILC include various start conditions peculiar to the corresponding operation step. These start conditions include, for example, a condition that some of sensors are turned on.

Figure 9C:
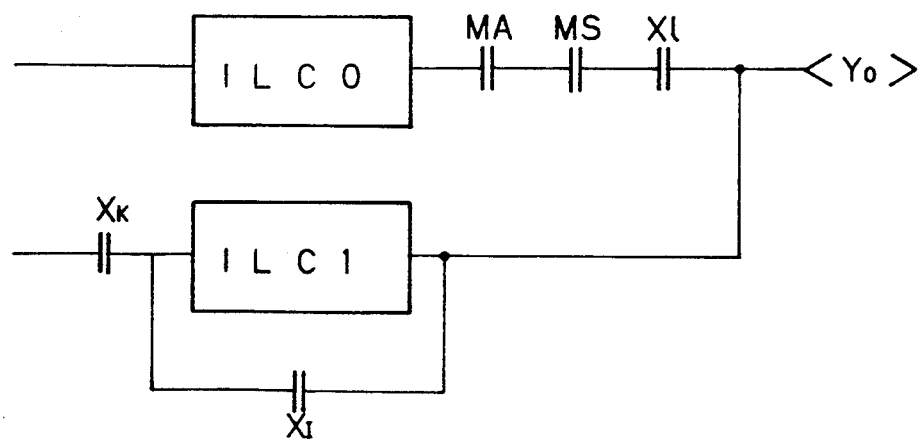
FIG. 9C is a diagram of an example of a step ladder pattern.

FIG. 9C illustrates an example of a standard operating circuit used in the automatic generation of the whole sequence. Referring to FIG. 9C, a condition $M_A$ is closed in an automatic mode (in which the Operations of the production line are performed in accordance with the sequential control program). A condition $M_S$ is closed when this operating circuit operates in a manual mode. The condition $M_S$ is ordinarily closed. Accordingly, in the ordinary automatic mode, output $Y_0$ is issued if an interlock condition $ILC_0$ and an operation condition $X_1$ of the step which is prior by one are satisfied. On the other hand, $ILC_1$ describes the logic of an initiating condition in the manual mode. Since the contact $M_S$ is opened in the manual mode, $Y_0$ is output if conditions $X_k$ and $ILC_1$ are simultaneously satisfied or if the conditions $X_k$ and $X_I$ are simultaneously satisfied. Ordinarily, $X_I$ is a logic for nullifying the manual operation interlock condition $ILC_1$.

As is apparent from this relationship, the contact conditions $M_A$, $M_S$, $X_I$ and so on can be set by the system in a standardized manner without any troublesome manual programming work.

System Hardware Construction

Figure 1A:
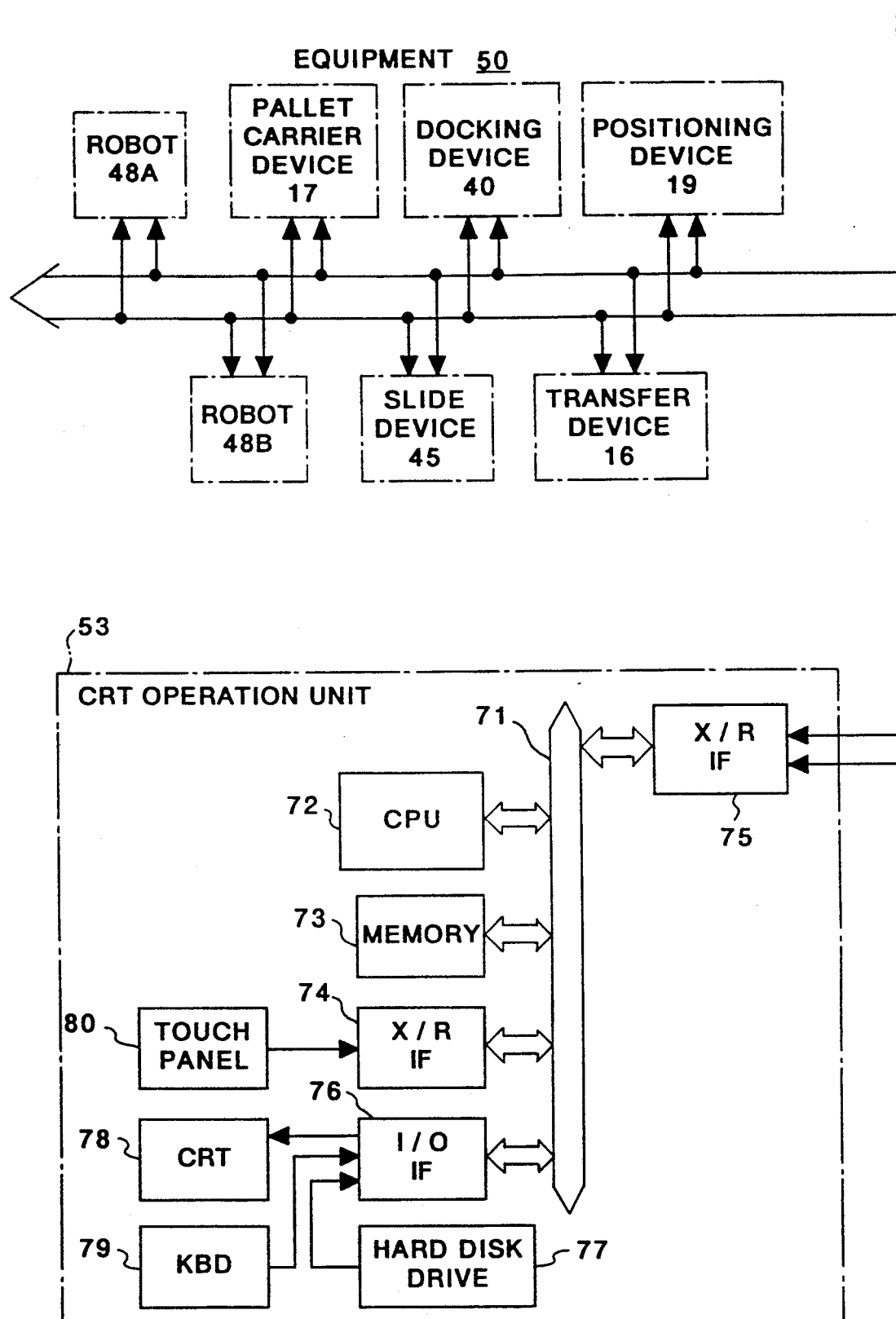
FIGS. 1A and 1B are diagrams of the hardware construction of a simulation system in accordance with a preferred embodiment of the present invention.
Figure 1B:
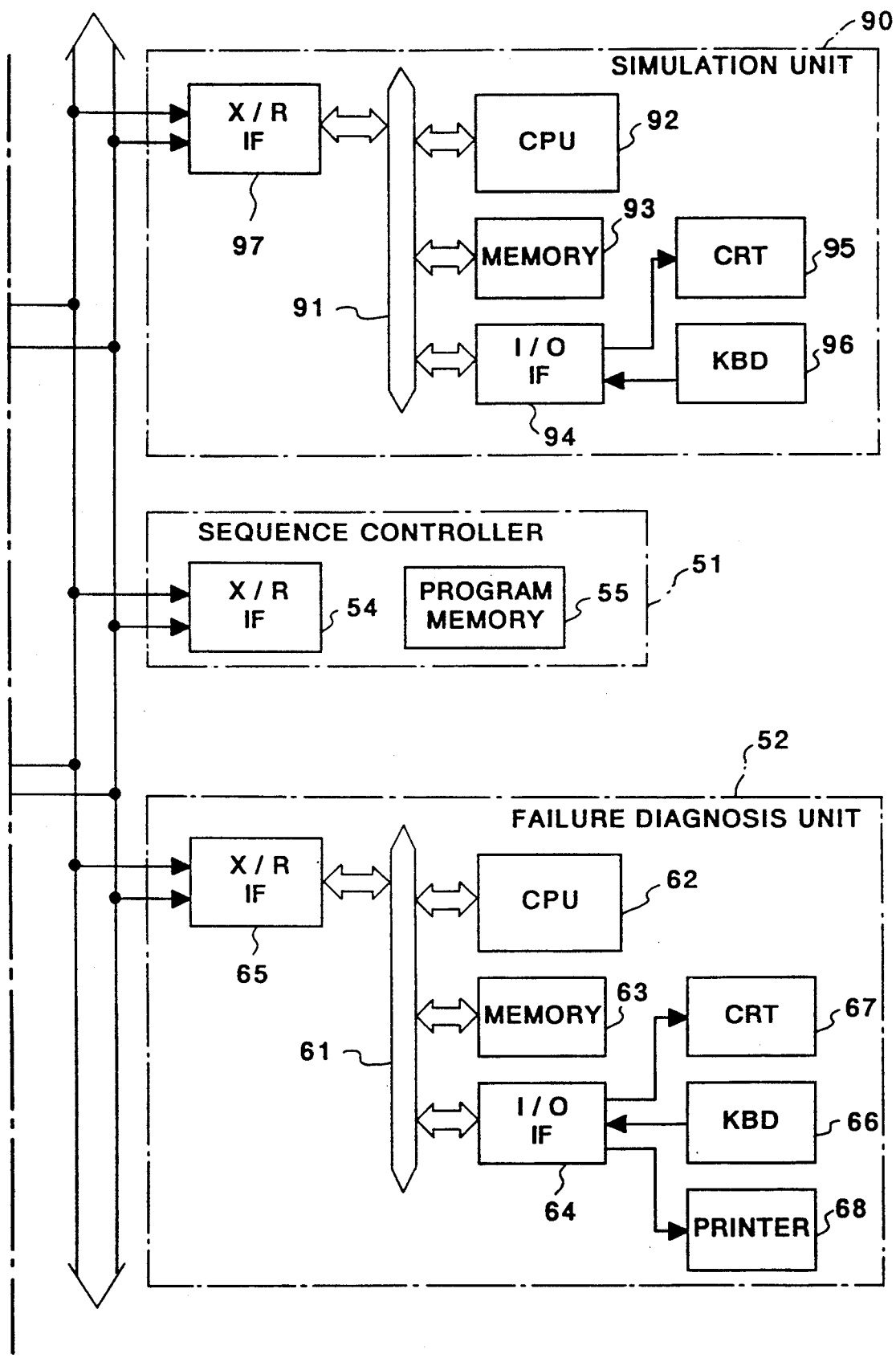

The sequential control/simulation system in accordance with this embodiment has, as shown in FIGS. 1A and 1B, a sequential control section 51 which is connected to equipment units 50, i.e., the objects of sequential control and which effects sequential control of the equipment units 50, a simulation section 90 which effects simulation, a diagnosis section 52 which effects malfunction diagnosis, and a CRT (cathode ray tube) operation panel section 53.

The sequential control section 51 incorporates a program memory 55 in which a sequential operation control ladder program (FIG. 11) and a simulation program (FIG. 12) connected to the same are stored, and a computer having a transmission/reception interface 54 (denoted as X/R IF). The malfunction diagnosis section 52 has a central processing unit (CPU) 62, a memory 63, an input/output interface (I/O IF) 64 and a transmission/reception interface 65 connected through a bus line 61. The malfunction diagnosis section 52 is also provided with a keyboard KBD 66, a display CRT 67, and a printer 68 connected to the I/O interface 64. The CRT operation panel section 53 has a CPU 72, a memory 73, transmission/reception interfaces 74 and 75, and an I/O interface 76 connected through a bus line 71. The CRT operation panel section 53 is also provided with a hard disk unit 77 used as an auxiliary memory, a display CRT 78, and data/control code input keyboard KBD 79, which are connected to the I/O interface 76, and a touch panel 80 connected to the transmission/reception interface 74. The touch panel 80 is attached to the outer surface of a face plate of the CRT 78.

The transmission/reception interface 54 provided for the computer incorporated in the sequential control section 51, the transmission/reception interface 65 provided in the malfunction diagnosis section 52, an interface 97 of the simulation section 90, and the transmission/reception interface 75 provided in the CRT operation panel section 53 are connected.

The malfunction diagnosis section 52 receives program processing data representing the state of operation of a sequential operation ladder program and a simulation program in the sequential control section 51 from the sequential control section 51 through the transmission/reception interfaces 54 and 65, processes this data with the CPU 62 to obtain a display signal and an output signal based on the program processing data, and supplies through the I/O interface 64 the display signal to the CRT 67 and the output signal to the printer 68.

Figure 17:
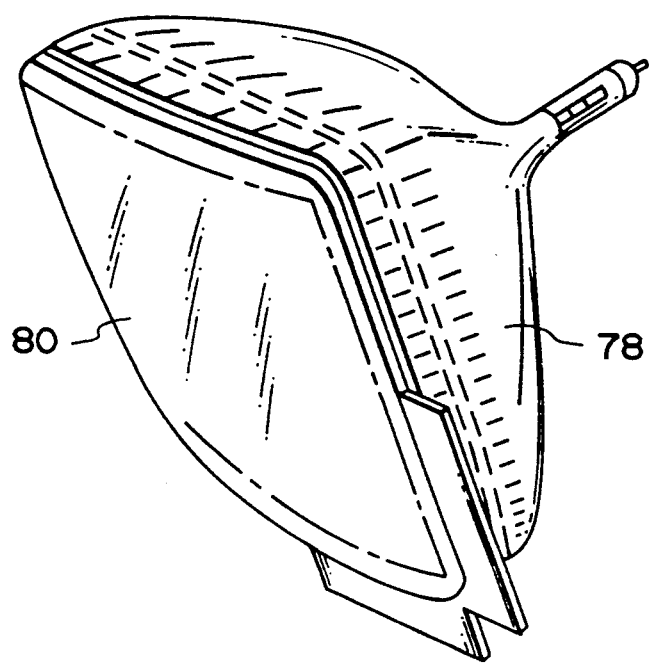
FIG. 17 is a diagram of the construction of a CRT of an operation panel 53 of the system shown in FIG. 1.
Figure 18:
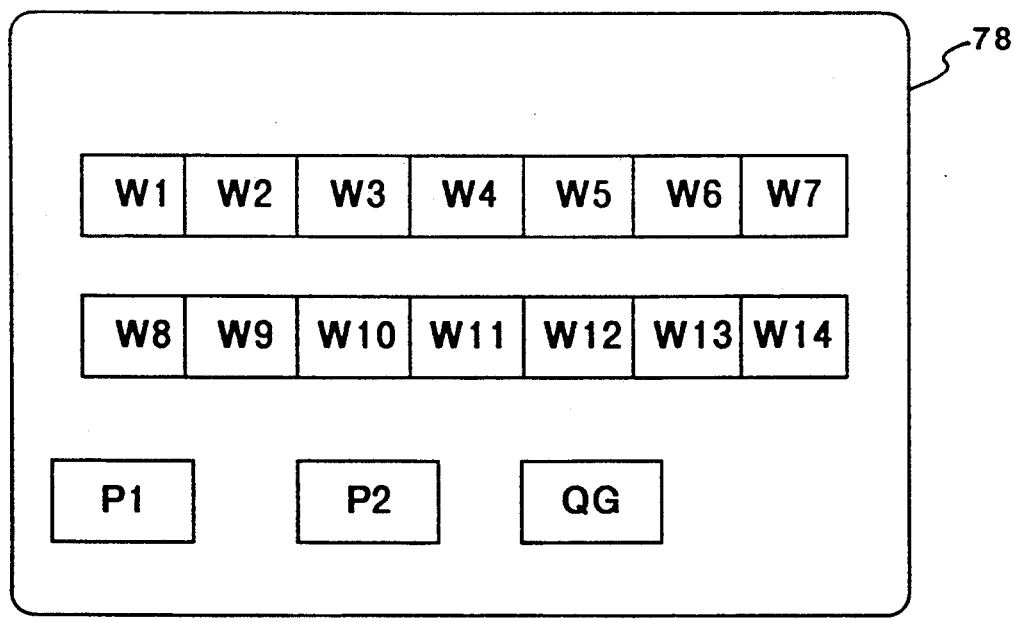
FIG. 18 is a diagram of a state of display of the CRT shown in FIG. 17.

The CRT operation panel section 53 is connected to the sequential control section 51 through the transmission/reception interface 75 and the bus line 71. The operation panel section 53 includes the CPU 72 for controlling the whole of this section, the memory 73 for storing data, and user interface devices including the touch panel 80, CRT 78 and the keyboard 79. As shown in FIG. 17, the touch panel 80 attached to the outer surface of the face plate of the CRT 78 is formed as a generally transparent member. When an operator's finger or the like is brought into contact with the surface of the touch panel 80, an output signal corresponding to the contact position is generated. As shown in FIG. 18, the CRT 78 displays, on its face plate, arrays of icons, such as a plurality of icons (operation elements) W1 to W14 for control of the sequential control section 51, icons P1 and P2 for display changeover, and an icon QG for function changeover. Data on display of a plurality of icons selectively displayed on the face plate of the CRT 78 is stored in the hard disk unit 77. The operator selects one of the icons displayed on the face plate of the CRT 78 by touching the surface of the touch panel 80 at the position corresponding to the selected icon. An output signal then obtained from the touch panel 80 is sent through the transmission/reception interface 74 as an operation input which designates the state in which the selected one of the operation elements of the operation panel corresponding to the contact position on the touch panel 80 is operated. The operation input sent through the transmission/reception interface 74 and is supplied to the CPU 72 and is also supplied from the transmission/reception interface 75 to the sequential control section 51 through the transmission/reception interface 54 thereof. The operations of the sequential operation control ladder program and the simulation program are controlled in the sequential control section based on the supplied signal.

Automatic Formation of Sequential Control Program

A procedure for automatically composing the sequential control program for sequential control of the operations of the equipment units for the vehicle assembly line described above will be schematically described below. Data required for automatic formation of the control program includes standard step ladder patterns, an input/output map, and the above-mentioned operation block map and operation step map. The standard step ladder patterns constitute a data base which stores symbols of operation circuits with which all operations necessary for the production line control program are described. An example of the standard patterns is shown in FIG. 9C.

Ordinarily, the input/output map is a data base in which various input/output relationships between operation circuits which may be used for the production line. FIG. 7 shows an example of the input/output map data base. The data of the standard step ladder pattern data base and the input/output map data base is not peculiar to a certain production line but common to a plurality of production lines.

The operation block map data and the operation step map data are specially provided for one production line. Data in the operation block map describes each of the above-described operation blocks as well as the linkage relationships between the operation blocks. FIG. 6 shows an example of operation block map data peculiar to the production line shown in FIG. 2. The operation step map consists of special data describing the operation steps included in the operation blocks peculiar to a certain production line. FIG. 8 shows an example of the operation step map special to the production line shown in FIG. 2.

The sequential control program is formed on the basis of the two standard data bases and the two categories of special data.

Figure 10A:
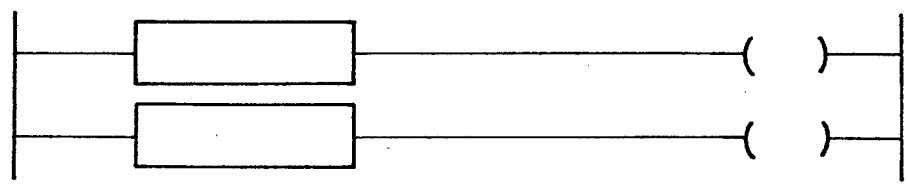
FIG. 10A, 10B, and 10C are diagrams of other examples of the step ladder pattern.
Figure 10B:
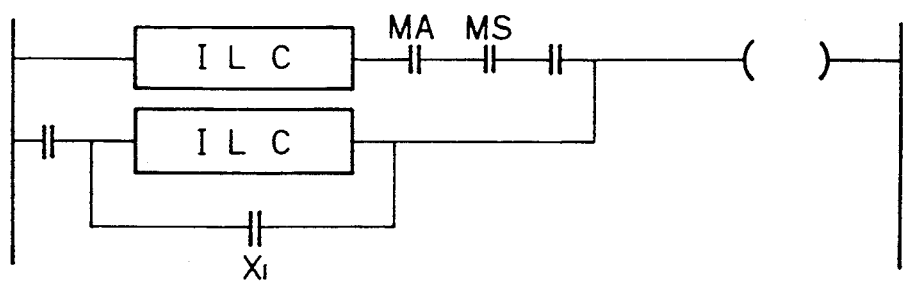
Figure 10C:
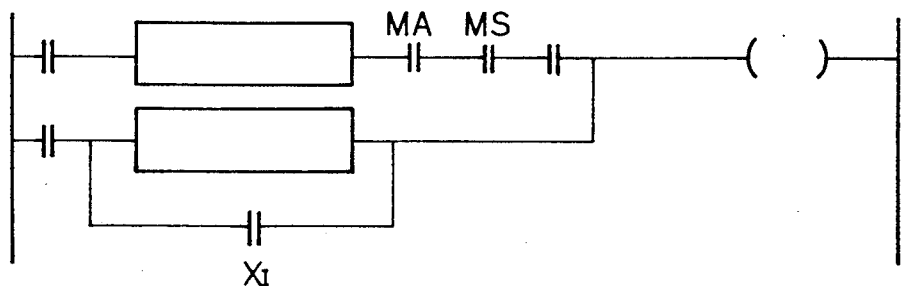

The standard step ladder pattern data base is as shown in FIGS. 10A to 10C. FIG. 10A shows a pattern of a standard type describing the start and stop of an operation block. FIG. 10B shows the same pattern as that described above with reference to FIG. 9C. FIG. 10C shows a pattern formed by adding a contact condition to the pattern shown in FIG. 10B.

The input/output map is as described below. In the input/output map, the input/output status of all the equipment units used for the production line are previously described in the form of a table. The input/output map shown in FIG. 7 is provided for the positioning unit 19 shown in FIG. 2. In this input/output map, the contents of input/output operation are shown in the column "COMMENT", the contents of the column "No." are automatically prepared, and, the contents of the columns "COMMENT", "OPERATION" and "ORIGINAL POSITION" are input by the operation of the keyboard 67. "OUTPUT COIL DEVICE", "CONFIRMATION INPUT CONTACT DEVICE" and "MANUAL INPUT CONTACT DEVICE" are set automatically.

For example, the operation type of the operating circuitry BF (positioning) of A02 is "OUTPUT" (out) and the terminal of the output coil is Y1. The name of the contact for confirmation input at the time of outputting is "X1". The name of the contact for manual input is "XB".

The standard ladder pattern data base and the input/output map are stored in the hard disk 51.

Next, the operation block map data will be described below. This map data is obtained by analyzing the operation of the production line and expressing the steps of the production line with operation blocks in accordance with the above-described definition. The operation block map of FIG. 5 is a table expressing an operation block chart, such as that shown in FIG. 5, which is obtained as a result of analysis of the production line of FIG. 2. In other words, the table (map) of FIG. 6 is generally equal to the chart of FIG. 5.

In FIG. 6, the contents of "SC-REG" designate twelve 16-bit registers respectively provided for the operation blocks B0 to B11. Each register indicates that which operation step of the corresponding block is executed at present. For example, in a case where the operation step of B0S0 of the operation block B0 (refer to FIG. 8) is executed, "B0S0" is stored in the SC-REG area for the operation block B0.

Each of the contents "FROM" of the operation block map designates an operation block which is placed in front of the corresponding operation block and which relates to the condition for starting the operation of the corresponding operation block. For example, the termination of the operation blocks B0 and B1 is a condition for starting the operation block B3. Each of the contents "TO" designates an operation block which is immediately subsequent to the corresponding operation block and whose operation is started by the completion of the corresponding operation block. For example, the termination of the operation block B3 means the start of the operation blocks B5 and B7. Each of the contents "CLEAR CONDITION" designates an operation block with which the equipment unit relating to the corresponding operation block is returned to the starting position. Further, "EQUIPMENT" designates the sequential control object equipment unit relating to each operation block.

The contents of "No." and "SC-REG" are formed automatically, while the contents of "BLOCK NAME", "FROM", "TO", "CLEAR CONDITION", and "EQUIPMENT" are input by the operation of the keyboard 67 effected by the programmer.

Next, the operation step map shown in FIG. 8 will be described below. As mentioned above, the contents of specific operations of each operation block are described as operation steps. In other words, the input/output map (FIG. 7) does not represent any operation sequence. However, each item of the map expresses a stand alone operation of each equipment unit. FIG. 8 shows an example of the operation step map for the operation block B0. In FIG. 8, the contents of "No." are automatically prepared by the system. That is, each of the contents of "No." indicating the operation step order, e.g., "B000" and "B0S0" to "B0S9" with respect to the operation block B0, is formed by the system each time the programmer inputs "COMMENT" through the keyboard 67. "B000" designates an operation step corresponding to the preparation of this operation block and is placed at the top of each operation block of the ladder program. "B999" designates an operation step corresponding to the completion of this operation block and is placed at the end of each operation block of the ladder program.

For formation of the operation step map, it is necessary to use at least items of "COMMENT" information which are input in order of the step sequence. For example, if the programmer inputs "BF(POSITIONING)" at the step number "B0S1" and inputs an operation type "OUTPUT", the data designated by the number "A02" (FIG. 7), having the comment name "BF(POSITIONING)" of the input/output map is read out. The data designated by "A02" of the input/output map indicates that the confirmation input contact is "X1" and that the manual input contact is "XB". These data items are written in the corresponding positions in FIG. 8. "Y0" of the output coil of the step "B0S1" is the name given to the top operation step of the operation block.

Thus, the system searches the input/output map (FIG. 7) for the data corresponding to the "COMMENT" and "OPERATION TYPE" input by the programmer to form the operation step map (FIG. 8). Similar operation step maps are formed for other operation blocks.

In the operation step map shown in FIG. 8, data $\tau$ shown in the right end column OPERATION PERIOD represents the predicted operation time of each operation step. The data $\tau$ is important to formation of a simulation program.

Figure 11:
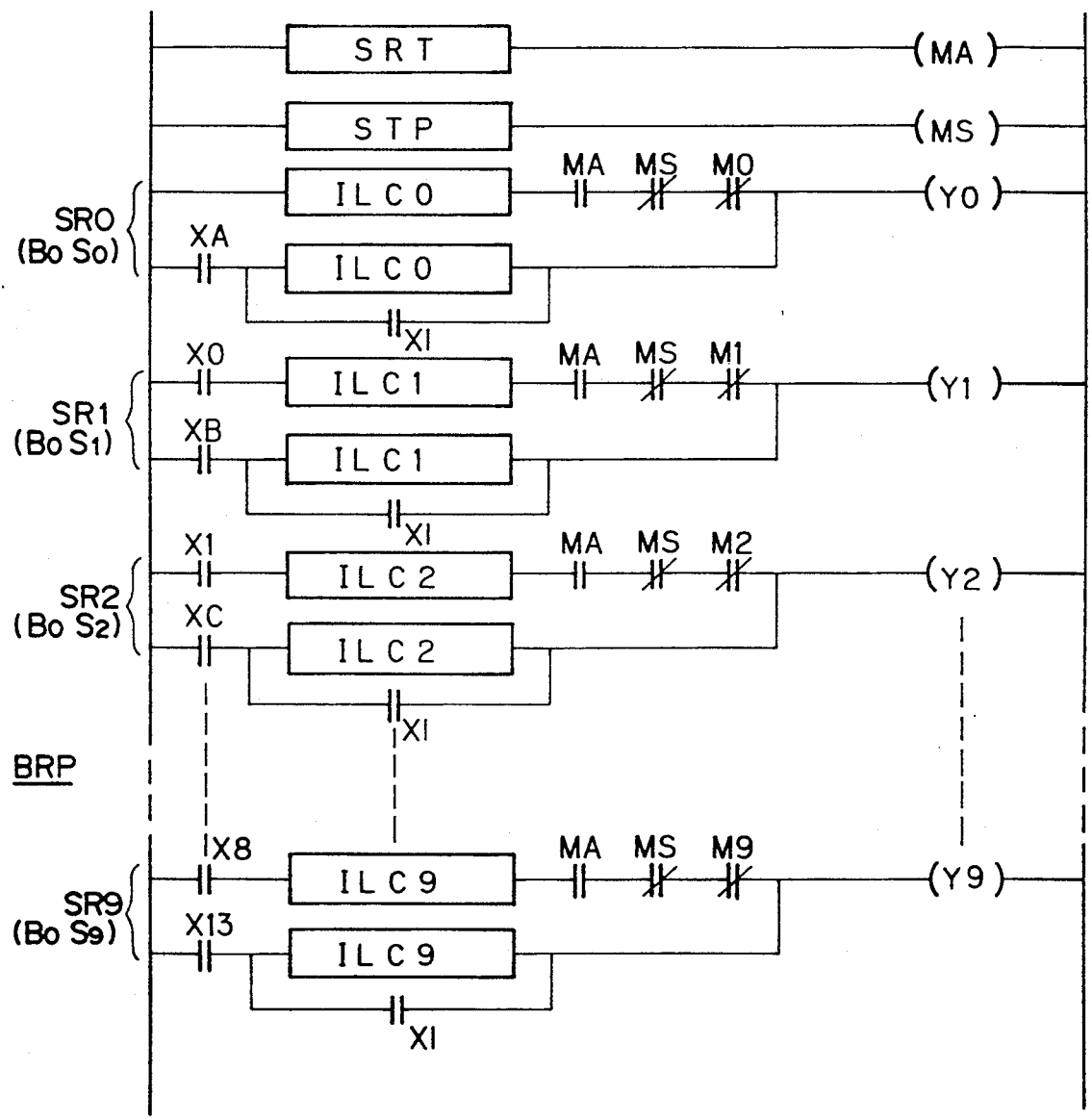
FIG. 11 is a diagram of ladder program elements for the operation block 0 of the map shown in FIG. 5.

FIG. 11 shows a sequential ladder program formed with respect to the block $B_0$ by the method described above. The construction of the ladder program shown in FIG. 11 can be understood well from comparison between the ladder program and the operation step map shown in FIG. 8. For example, with respect to the operation step $B_0S_0$, in the automatic operation mode where contact $M_A$ is closed, confirmation contact device $X_0$ is closed and output $Y_0$ is therefore issued. When $Y_1$ is output, confirmation input contact $X_0$ of the step $B_0S_1$ is closed. $Y_1$ is therefore output as long as interlock condition $ILC_1$ is satisfied.

The mutual operations of the operation blocks may have been understood from the above description of the automatic formation of the sequential control ladder program in the embodiment system and from the operation block map (FIG. 6). Also, it may have been understood from the operation step map and the input/output map (FIG. 7) that the control program is automatically formed at an improved efficiency.

Formation of Simulation Program

The features of the present invention reside in automatic formation of a simulation program for simulating a sequential control ladder program such as that shown in FIG. 11 formed in the above-described way.

To compose a simulation program in accordance with this embodiment, simulation program elements are prepared with respect to the operation blocks. Simulation program elements referred to herein are ladder program elements for simulating the operation of one operation step. Each simulation program element is formed of, for example, a timer element and other elements, as in the case of an element $SSP_0$ shown in FIG. 12.

Figure 12:
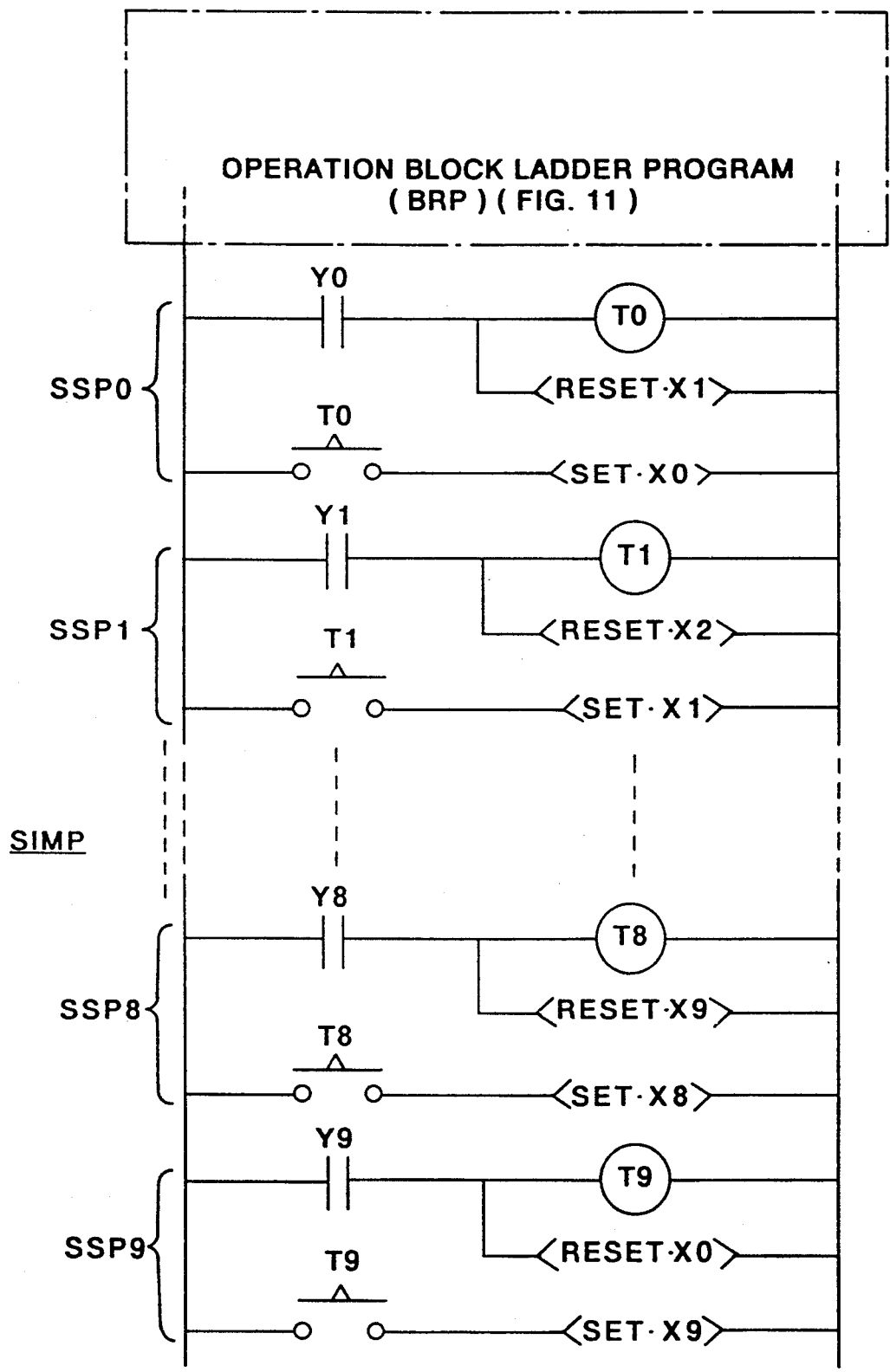
FIG. 12 is a diagram of simulation ladder program elements for the operation block 0 of the map shown in FIG. 5.

Elements $SSP_n$ of the simulation program SIMP shown in FIG. 12 are connected in series to the sequential control ladder program BRP shown in FIG. 11 to simulate each ladder element $SR_n$ thereof.

In FIG. 12, symbol Tn with ◯ represents a timer element, a contact symbol $T_n$ represents a contact of the timer $T_n$. The simulation ladder element $SSP_n$ is started by conditions (interlock conditions) necessary for producing output $Y_n$ of the operation step ladder element $SR_n$, and produces start output $X_n$ for the next operation step ladder element $SR_{n+1}$ after a period of time ($=T_n$) corresponding to the actual time for operation of the actuator of each step.

This operation will be described below in more detail with respect to $SSP_0$. When a condition for output $Y_0$ is given, the timer element $T_0$ is started and output RESET $X_1$ is output. The condition for output $Y_0$ corresponds to interlock condition $ILC_0$ of $SR_0$. Confirmation input contact $X_1$ of $SR_1$ shown in FIG. 11 is reset by RESET $X_1$. That is, simulation is effected so that confirmation input contact $X_0$ on the equipment side is reset. After passage of time $T_0$, output SET $X_0$ is issued from $SSP_0$. During this period of time, simulation of $SR_0$ is effected. Contact $X_0$ of $SR_1$ is closed by SET $X_0$. The conditions for outputting $Y_1$ from $SR_1$ shown in FIG. 11 are thereby satisfied except for $ILC_1$. Next, condition $Y_1$ for Output $Y_1$ is input by $SSP_1$. Timer $T_1$ of $SSP_1$ is started by $Y_1$ and RESET $X_2$ is output.

As these operations are performed continuously, the block ladder program BRP is simulated by the simulation program SIMP. During this process, data on the state of operation of the sequential control ladder program BRP and the simulation program SIMP is set from the sequential control section 51 to the operation panel section 53 and the malfunction diagnosis section 52 through the transmission/reception interfaces 54, 75, and 65. The progress of each of the sequential control ladder program BRP and the simulation program SIMP is displayed by the CRTs of these sections or the corresponding data is output to the printer 68.

Figure 19A:
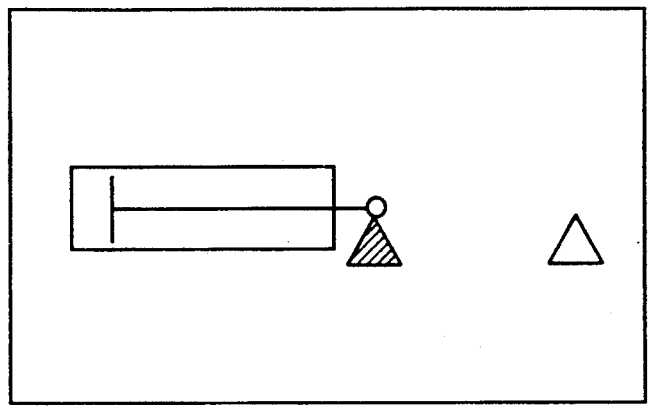
FIGS. 19A to 19C are diagrams of examples of display of the states of operation steps during the simulation process.
Figure 19B:
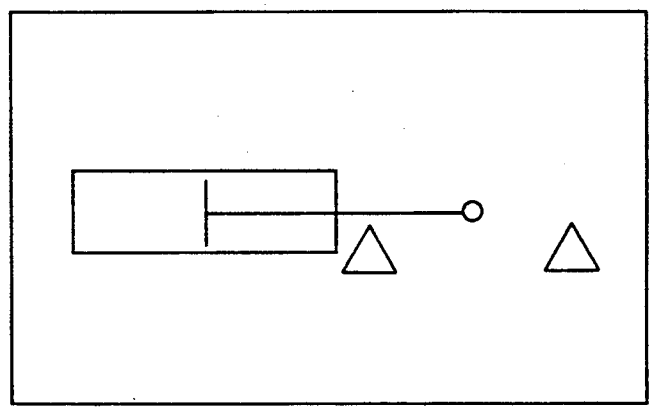
Figure 19C:
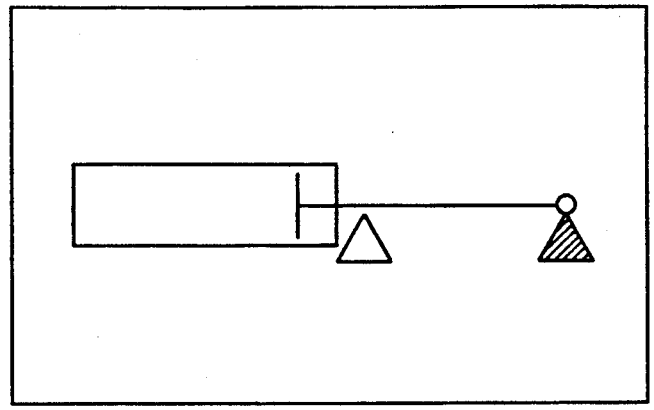

During the period of time when simulation of BRP is performed, while each of the simulation ladder elements SSP of a plurality of actuator operations constituting the simulation program SIMP is being executed, the CRT 67 of the malfunction diagnosis section 52 displays according to the state of operation of the SSP, as shown in, for example, FIGS. 19A to 19C. FIGS. 19A to 19C respectively show a state in which the operation of each operation step symbolized with the cylinder symbol shown in FIG. 9A is at a reference position (left triangle of FIG. 19A), a state between the reference position and an operated position (FIG. 19B), and a state at the operated position (right triangle of FIG. 19C).

The simulation program shown in FIG. 12 serves to simulate the operations of the block $B_0$ as a single group of operations. In other words, the simulation program for the block $B_0$ is executed irrespective of the states of operation of the other blocks. This is because the operation of each operation block is performed independently of the other operation blocks, as mentioned above with respect to the definition of the operation blocks. This independence must be maintained with respect to the simulation program also. The simulation program elements shown in FIG. 12 are therefore made in dependent of those of the other operation blocks.

However, if such independence is maintained, there is a possibility of a difference between the actual parallel operation and the simulated operations, as described below. For example, in a case where a block connection relationship such as that shown in FIG. 5 is provided, the operation steps of the operation block $A_0$ are executed first, the operation steps of the block $A_1$ are next executed, and the operation steps of the block $B_0$ are then executed. That is, even if execution of each operation block essentially involves a part of parallel operation (for example, parallel operation of $B_0$ and $B_1$), the simulated operations are sequential.

Figure 13:
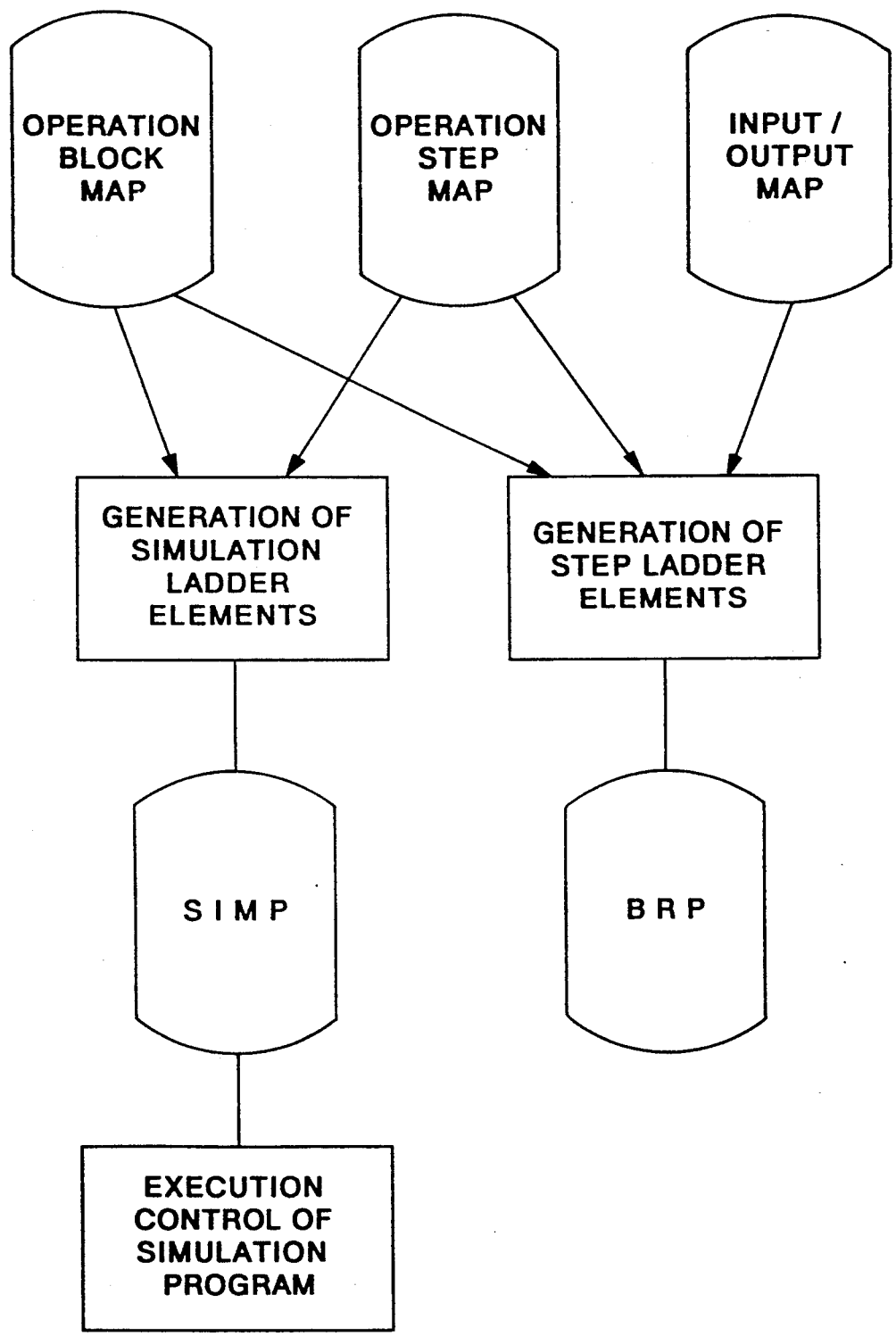
FIG. 13 is a diagram of execution of simulation in accordance with the embodiment.

In the automatic simulation program composition system of this embodiment, therefore, ①: the step ladder program (BRP) for operating each operation block and the corresponding simulation program SIMP are first prepared for each operation block. SIMP can be composed by the method described above with reference to FIG. 12 since the operation block itself is independent of the other blocks. The program for forming SIMP described with reference to FIG. 12 may be called a simulation ladder element formation program, and this formation program is supplied with the operation block map (FIG. 6) and the operation step map (FIG. 8) to form SIMP, as shown in FIG. 13.

②: The order of execution of $SSP_n$ of each operation block of SIMP thus formed is controlled with an execution order control program shown in FIG. 13. This control program is supplied with the operation block map, the operation step map and the simulation program SIMP to control execution of each SSPn.

Figure 14:
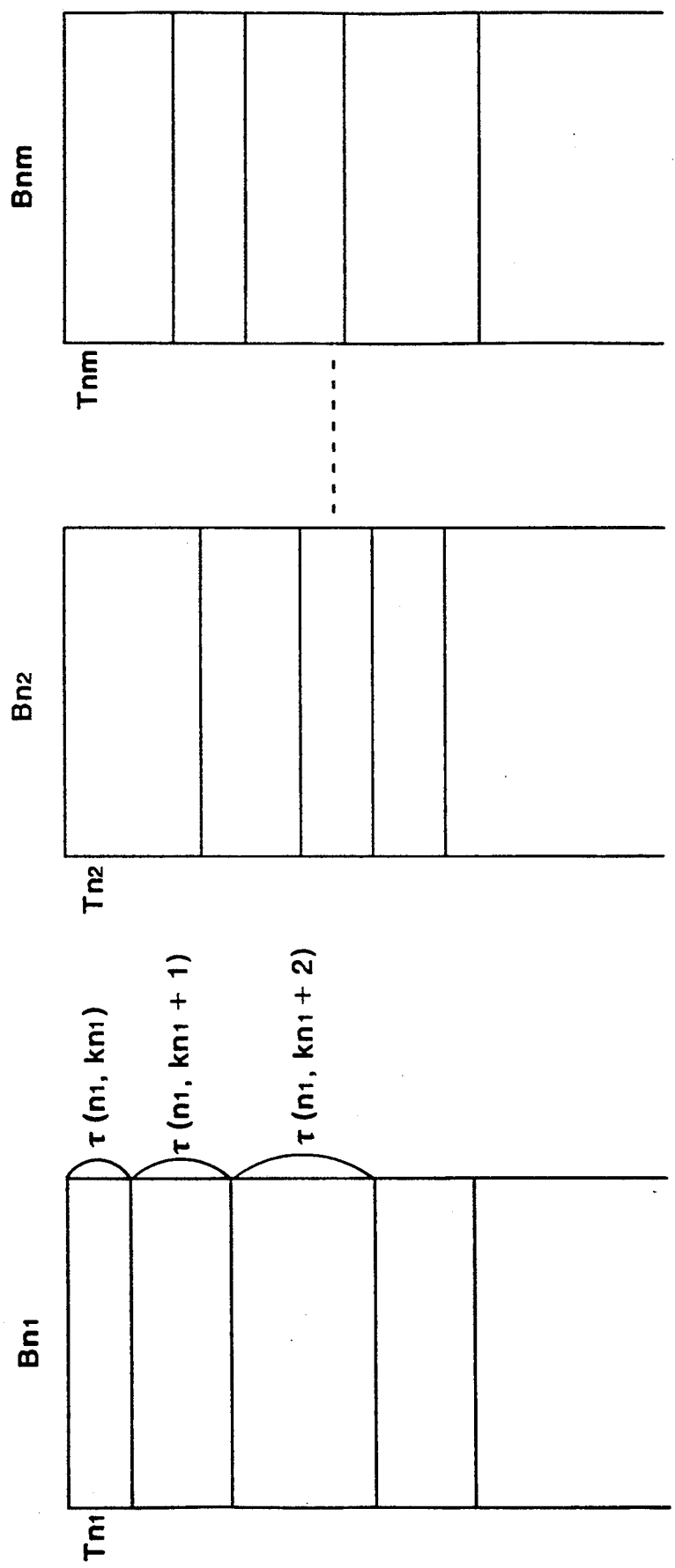
FIGS. 14 and 15 are diagrams of operation step execution order control with respect to operation blocks in a parallel operation relationship.
Figure 15:
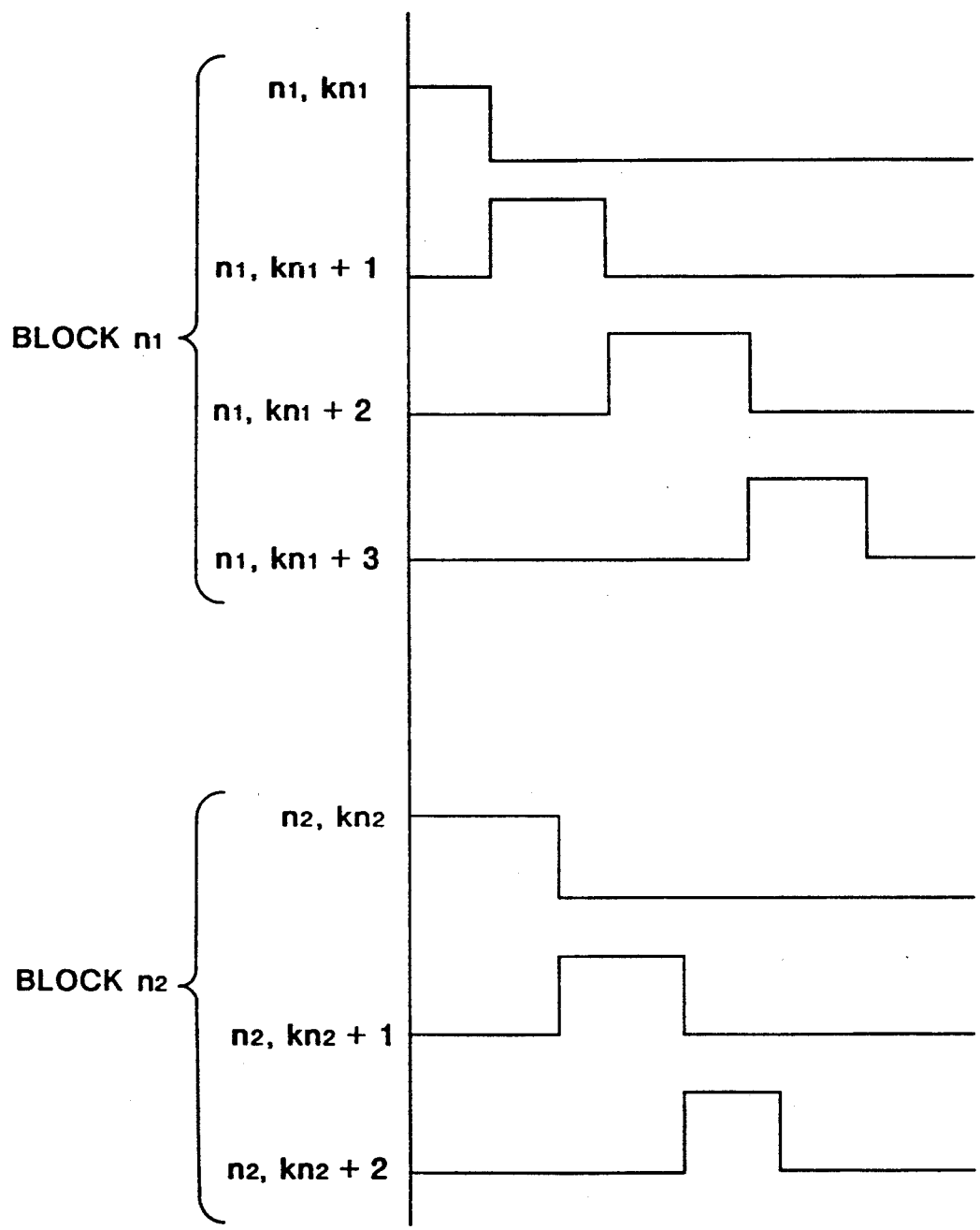

FIGS. 14 and 15 schematically show the operation of this execution order control program. In this control program, the operation blocks whose operations are to be performed in parallel with each other is first recognized from the operation block map and the number of these operation blocks is detected. This recognition can be easily effected since the operation block map has the data which describes the start relationships between the blocks (FROM and TO of FIG. 6). It is assumed here that the number of blocks thus recognized whose operations are to be performed in parallel with each other is m, and that these blocks are blocks with suffixes $n_1$, $n_2$, ... $n_m$, i.e., blocks $B_{n1}$, $B_{n2}$, ... $B_{nm}$. The operation step maps corresponding to these blocks are rearranged in the memory as shown in FIG. 14. By this rearrangement, only the operation steps of the parallel operation blocks are extracted. A secondary effect is thereby obtained such that the efficiency of the simulation operation based on the execution order control program is thereby improved, and that the result of simulation is approximated to the actual performance.

In FIG. 14, for better understanding, the time $\tau$ taken to perform the operation of each operation step is indicated by the longitudinal width of the rectangle representing the operation step. In FIG. 14, $$\tau(n_1, k_{n1})$$

denotes the time for the Operation of the step number $k_{n1}$. The operation time $\tau$ of each operation step is expressed in this way, and the operation steps of the plurality of parallel operation blocks are expressed in a timing chart such as that shown in FIG. 15. For convenience sake, FIG. 15 shows a timing chart relating to the operation blocks $n_1$ and $n_2$ alone. As is apparent from this timing chart, the execution order is controlled by the execution order control program in such a manner that the operation step $(n_1, k_{n1})$ is first executed, the step $(n_2, k_{n2})$ is next executed, and the step $(n_1, k_{n1}+1)$ is executed, followed by the step $(n_2, k_{n2}+1)$, the step $(n_1, k_{n1}+2)$ and so on.

For this execution order control, the execution order control program has a variable register for storing data on elapse of time indicating which step of each operation step is presently executed. This register is represented by $T_{ni}$ with respect to operation block $B_{ni}$.

Figure 16:
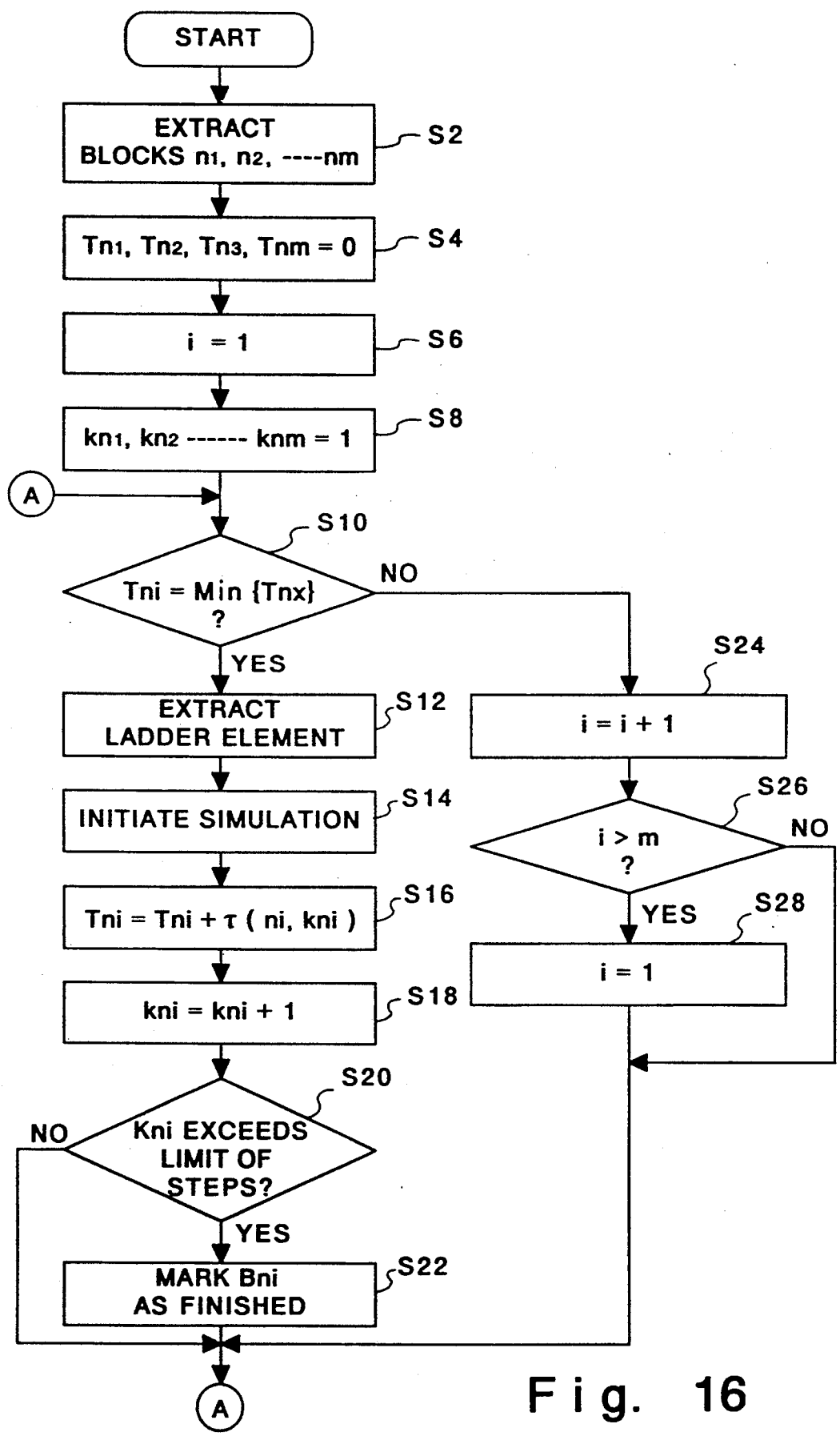
FIG. 16 is a flow chart of the control procedure of an execution order control program.

FIG. 16 shows a flow chart representing the process of the execution order control program. The operation of the execution order control program in accordance with this flow chart will be described below in detail.

In step S2, all operation blocks in parallel operation relationships are extracted from the operation block map (FIG. 6). Symbols $n_1$, $n_2$, ... $n_m$ are attached to these operation blocks. In step S4, the registers $T_{n1}$, $T_{n2}$ ... for storing times elapsed with respect to the operation blocks are cleared to 0, since one of the operation steps of the operation blocks in a parallel relationship at the starting time point is a number 0 operation step, and since the time elapsed with respect to this step is zero. In step S6, variable i is initialized. In step S8, a variables k for designating the operation step number is initialized to 1.

In step S10, determination is made as to whether or not the value of the elapsed execution time stored in register $T_{ni}$ designated by the variable i with respect to the block $B_{ni}$ is equal to the minimum of the elapsed time $T_{nx}$ (x=1 to m) of all the blocks including the other blocks. It is thereby determined that the operation step $K_{ni}$ of the operation block $B_{ni}$ indicated by the variable i is to be operated for simulation at present, or that one of the operation steps in the other blocks is to be executed for simulation prior to the operation step presently selected.

If YES in step S10, the process proceeds to step S12, the ladder program element of the operation step $K_{ni}$ is extracted and interlock conditions are recognized. In step S14, the corresponding SSP $(n_i, k_{ni})$ is started. In step S16, the elapsed time register $T_{ni}$ is updated. That is, $$T_{ni} = T_{ni} + \tau(n_i, k_{ni})$$

Thus, the block $B_{ni}$ has been simulated to the operation step $k_{ni}$. In step S18, the Counter $k_{ni}$ indicating the operation step is incremented by 1. In step S20, determination is made as to whether or not simulation is effected with respect to all the operation steps of the operation block $B_{ni}$. If the simulation of this operation block is not completed, the process returns to step S10. If the simulation is completed, the completion of simulation of this block is marked. By this marking, searching in the block $B_{ni}$ is stopped, thereby increasing the overall process speed.

The operation with respect to the case where the result of determination in step S10 is NO is as described below. In this case, $$T_{ni} > \text{MIN}\{T_{ix}\}$$

Since simulation of the block $B_{ni}$ satisfying this equation is in advance of simulation of the other blocks, the process proceeds to step S24 and the variable i is incremented to scan another block.

By the above operation, simulation of operation steps of the operation block indicated by one of the registers $T_{ni}$ having the smallest value is effected with priority. Consequently, simulation of operation steps conducted in parallel with each other can be performed with parallelism approximated to the actual parallelism.

In steps S26 and S28, the variable i is reset to 1 after the operation block has been scanned from i=1 to i=m.

As described above, the sequential control ladder program and the simulation program SIMP connected to each of the block ladder programs BRP constituting the sequential control ladder program are stored in the memory 55 of the computer incorporated in the sequential control section 51 and, under this condition, the operator touches the touch panel 80 of the CRT operation panel 53 at the position of the icon for starting the sequential control ladder program, thereby starting this program. By this starting, the step ladder elements constituting BRP and the simulation ladder elements constituting SIMP are successively operated so that the process of the simulation program SIMP connected to BRP is continuously conducted.

Example of Modification

The present invention can be modified in other various ways without departing the scope of the invention. For example, while in the above-described embodiment the present invention is applied to a motor vehicle production line, the present invention is not limited to this application field. The present invention is applicable to any system so long as sequential control is performed.

Figure 20A:
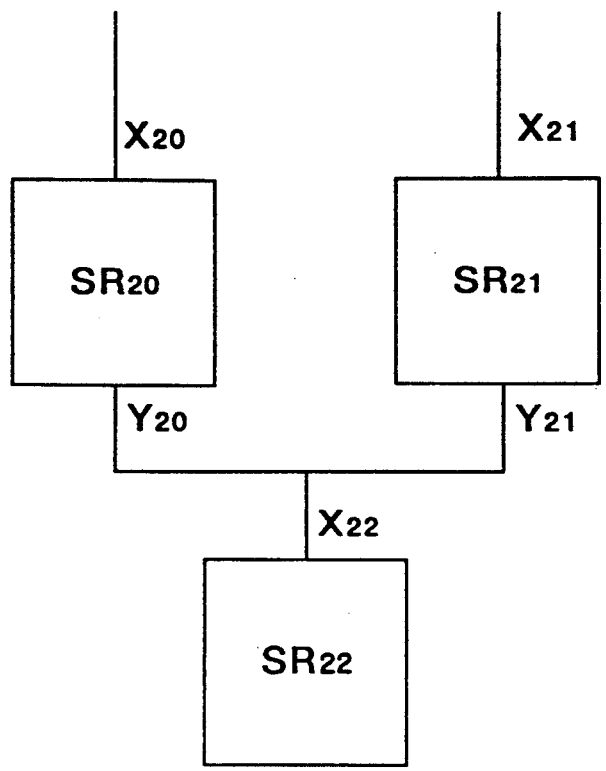
FIGS. 20A and 20B show operations relating to an example of a modified system, where
Figure 20B:
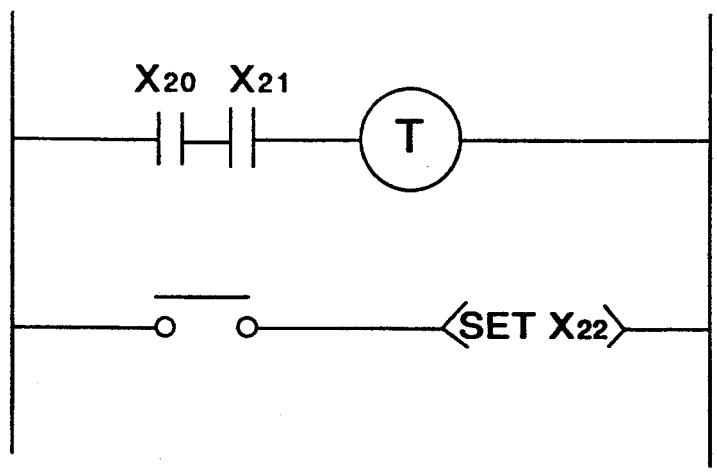

In the simulation system in accordance with the described embodiment, simulation is effected with respect to one operation step at a time. However, the present invention is not limited to this, and a plurality of operation steps SR may be simulated with one simulation element SSP. FIG. 20A shows an example of sequential control program BRP in which a ladder element $SR_{22}$ is operated by receiving outputs $Y_{20}$ and $Y_{21}$ from a ladder element $SR_{20}$ having a confirmation contact $X_{20}$ and another ladder element $SR_{21}$ having $X_{21}$. FIG. 20B shows a simulation ladder element for simultaneously simulating $SR_{20}$ and $SR_{21}$.

In the above-described embodiment, the order of the operation steps in operation blocks in a parallel operation relationship is determined based on the predicted execution time τ previously set. However, the determination of order is not limited to this.

The present invention is not limited to the above embodiment and various changes and modifications can be made within the spirit and scope of the present invention. Therefore, to apprise the public of the scope of the present invention the following claims are made.

What is claimed is:

1. A method of composing a simulation program implemented by a data processor for stimulating a sequential control program describing sequential operations of a production system used in a production line having a plurality of equipment units, the sequential control program including a plurality of objective ladder program elements describing operation steps including the sequential operations of the production line each of the plurality of objective ladder program elements including an interlock condition describing conditions which are to be satisfied to start each of the plurality of objective ladder program elements, and a confirmation condition for confirming completion of one of the operation steps effected immediately before another of the operation steps, said method comprising the steps of:
    (a) previously measuring a first time required to satisfy the interlock, condition of each of the plurality of objective ladder program elements of the sequential control program stored in a first memory; and
    (b) composing a simulation ladder program element parallel to each of the plurality of objective ladder program elements of the sequential control program, said composing the simulation ladder program element step including the steps of
        counting a second time which is taken for a corresponding one of the plurality of objective ladder program elements and is measured in said previously measuring step using a timer element; and
        forcible satisfying the interlock condition of each of the plurality of objective ladder program elements in response to a time-out of the timer element using first logic and generating an output signal for determining whether the sequential control program is correct for driving one of the plurality of equipment units.

2. A method according to claim 1, wherein said composing the simulation ladder program element step further includes the step of starting another simulation ladder program element for a next operation step in response to the time-out of the timer element using second logic.

3. A method according to claim 1, wherein the sequential control program is stored in a second memory and the simulation program is stored in a third memory, and the sequential control and simulation programs are operated in parallel.

4. A method of composing a simulation program implemented by a data processor for simulating a sequential control program in which unit operations of each of the equipment units are expressed by operation steps, in which each of operation blocks includes a first set of the operation steps performed independently of other operation blocks, and in which sequential operations of the equipment units are described with a second set of the operation blocks, said method comprising the steps of:
    (a) forming an operation block map describing operations of the operation blocks in which some of the operation blocks operate in parallel with other of the operation blocks and storing the operation block map in a first register;
    (b) forming an operation step map in which with respect to each of the operation steps of each of the operation blocks, an execution sequence of each of the operation steps and a predicted time required to execute each of the operation steps are described and storing the operation step map in a second register; and
    (c) forming simulation ladder program elements for simulating the operation steps of each of the operation blocks in an operation step execution order determined using the operation block map and the operation step map, and executing the simulation and outputting a signal which is used to determine whether the sequential control program is correct for diving one of the plurality of equipment units.

5. A method according to claim 4, further comprising the step of:
    (d) connecting the simulation program and the sequential control program in series.

6. A method according to claim 4, wherein, in the forming step (c), the simulation ladder program elements for simulating the operation steps of the operation blocks which operate in parallel, are formed on the basis of linkage relationships between the operations of the operation blocks described in the operation block map, an order in which the operation steps in each of the operation blocks are executed, and the predicted time for each of the operation steps.

7. A method according to claim 4, wherein the operation blocks are formed so that each of the operation blocks is executed independently of the other operation blocks, said method further comprising the steps of:
    (e) providing that the operation blocks including operations performed in parallel are started in synchronization with each other, forming a timing chart of the operation steps of these operation blocks in accordance with operation orders and operation times; and
    (f) forming simulation elements for observing an elapse of time in accordance with the operation step execution order shown in the timing chart formed with respect to the operation blocks.

8. A method according to claim 4, wherein the forming step (c) includes forming the simulation ladder program elements on the basis of the predicted time of the operation steps.

* * * * *

UNITED STATES PATENT AND TRADEMARK OFFICE
CERTIFICATE OF CORRECTION

PATENT NO. : 5,173,869
DATED : December 22, 1992
INVENTOR(S) : SHUNJI SAKAMOTO et al.

It is certified that error appears in the above-identified patent and that said Letters Patent is hereby corrected as shown below:

Col. 19, line 38, "forcible" s/b --forcibly--;

Col. 20, line 27 "diving" s/b --driving--.

Signed and Sealed this

Second Day of November, 1993

Attest:

BRUCE LEHMAN

*Attesting Officer*  *Commissioner of Patents and Trademarks*